(12) United States Patent
Konno et al.

(10) Patent No.: US 7,442,022 B2
(45) Date of Patent: Oct. 28, 2008

(54) DRIVE APPARATUS FOR INJECTION MOLDING MACHINE, INJECTION APPARATUS, AND MOLD CLAMPING APPARATUS

(75) Inventors: Takeshi Konno, Chiba (JP); Yousuke Tokui, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 233 days.

(21) Appl. No.: 10/547,357

(22) PCT Filed: Mar. 4, 2004

(86) PCT No.: PCT/JP2004/002769

§ 371 (c)(1),
(2), (4) Date: Aug. 29, 2005

(87) PCT Pub. No.: WO2004/078453

PCT Pub. Date: Sep. 16, 2004

(65) Prior Publication Data

US 2006/0147578 A1 Jul. 6, 2006

(30) Foreign Application Priority Data

| Mar. 4, 2003 | (JP) | ............................. 2003-056568 |
| Apr. 24, 2003 | (JP) | ............................. 2003-120166 |
| May 6, 2003 | (JP) | ............................. 2003-127862 |

(51) Int. Cl.
*B29C 45/50* (2006.01)
(52) U.S. Cl. ..................... 425/150; 425/574; 425/587
(58) Field of Classification Search .................. 425/542, 425/574, 587, 589, 145, 150
See application file for complete search history.

(56) References Cited

U.S. PATENT DOCUMENTS 6,051,896 A  4/2000 Shibuya et al.

(Continued)

FOREIGN PATENT DOCUMENTS

EP       1 149 682 A2   10/2001

(Continued)

OTHER PUBLICATIONS

Johannaber F. et al., "Handbuch Spritzgiessen, Passage" XP 002300506, 2001, pp. 928-931.

(Continued)

*Primary Examiner*—James Mackey
(74) *Attorney, Agent, or Firm*—Squire, Sanders & Dempsey L.L.P.

(57) ABSTRACT

An object is to provide a drive apparatus for an injection molding machine which can generate a large thrust force and can provide short-cycled continuous drive. The drive apparatus includes a housing (11); a tubular linear motor (14) including a movable element (12) disposed within the housing (11) in a manner capable of advancing and retreating, and a stationary element (13) attached to the housing (11), the linear motor (14) serving as a first drive section; a member-to-be-driven (15) caused to advance and retreat together with the movable element (12); and a second drive section attached to the housing (11) and disposed such that at least a portion of the second drive section overlaps the linear motor (14) along the axial direction. By merely a slight increase in a radial dimension, the area of a permanent magnet (23) of the movable element (12) can be sufficiently increased, and the capacity of the linear motor (14) can be increased.

18 Claims, 19 Drawing Sheets

U.S. PATENT DOCUMENTS

| | | | |
|---|---|---|---|
| 6,769,892 B1 * | 8/2004 | Hehl | 425/589 |
| 6,793,477 B2 * | 9/2004 | Yoshioka | 425/574 |
| 6,835,061 B1 * | 12/2004 | Hehl | 425/589 |
| 2004/0037915 A1 * | 2/2004 | Dantlgraber | 425/589 |

FOREIGN PATENT DOCUMENTS

| | | |
|---|---|---|
| JP | 62-13310 | 1/1987 |
| JP | 11-58468 | 3/1999 |
| JP | 11-309752 A | 11/1999 |
| JP | 2001-300967 | 10/2001 |
| JP | 2002-079555 A | 3/2002 |
| JP | 2002-292704 A | 10/2002 |
| JP | 2002-330577 | 11/2002 |
| JP | 2002-370263 A | 12/2002 |

OTHER PUBLICATIONS

Partial European Search Report for European application No. EP 04 71 7238.

* cited by examiner

DRIVE APPARATUS FOR INJECTION MOLDING MACHINE, INJECTION APPARATUS, AND MOLD CLAMPING APPARATUS

TECHNICAL FIELD

The present invention relates to a drive apparatus for an injection molding machine, an injection apparatus, and a mold clamping apparatus.

BACKGROUND ART

Conventionally, hydraulic-type and electric-motor-type drive apparatus have been used for generating thrust force in various mechanical apparatus.

In a molding machine, which is one type of mechanical apparatus; for example, an injection molding machine, a resin is melted within a heating cylinder through application of heat; the thus-molten resin is injected under high pressure into a cavity of a mold apparatus so as to fill the cavity; and the resin within the cavity is cooled to set, thereby yielding a molded article.

The injection molding machine has a mold apparatus, a mold clamping apparatus, and an injection apparatus. The mold apparatus includes a stationary mold and a movable mold. The mold clamping apparatus includes a stationary platen to which the stationary mold is attached, a movable platen to which the movable mold is attached, and a mold clamping mechanism. The mold clamping mechanism is activated so as to cause the movable platen and the movable mold to advance and retreat, whereby the mold apparatus can perform mold closing, mold clamping, and mold opening. The injection apparatus includes a heating cylinder and a screw, which is disposed within the heating cylinder rotatably and in a manner capable of advancing and retreating. By means of causing the screw to advance, the resin is injected into the cavity of the mold apparatus from an injection nozzle attached to an end of the heating cylinder so as to fill the cavity.

In some cases, the injection apparatus uses a hydraulic-type or electric-motor-type drive apparatus for rotating and causing the screw to advance and retreat.

In the hydraulic-type drive apparatus, an injection cylinder is disposed behind a screw, and hydraulic pressure is applied to the hydraulic chamber of the injection cylinder so as to cause a piston connected to the screw to advance and retreat, whereby the screw can be caused to advance and retreat. Also, a hydraulic motor is disposed behind the injection cylinder. An output shaft of the hydraulic motor is connected to the piston. By means of driving the hydraulic motor, the screw can be rotated.

In the electric-motor-type drive apparatus, a pressure plate, which supports a screw such that the screw can rotate, is disposed in a manner capable of advancing and retreating in relation to a front plate that supports a heating cylinder; and, by means of driving an electric metering motor attached to the pressure plate, the screw can be rotated. A ball screw is disposed between the pressure plate and an electric injection motor. By means of driving the injection motor and converting rotary motion to rectilinear motion by means of the ball screw, the screw can be caused to advance and retreat.

In the hydraulic-type drive apparatus, the hydraulic motor for rotating the screw is disposed on a rotational shaft of the screw, so that the moment of inertia can be reduced. By contrast, in the electric-motor-type drive apparatus, the metering motor for rotating the screw cannot be disposed on the rotational axis of the screw, so that the moment of inertia cannot be reduced. Accordingly, the electric-motor-type drive apparatus fails to exhibit high-speed performance, high responsiveness, and high control accuracy.

In order to cope with the above problems, an injection apparatus that uses a linear motor as a drive apparatus can be conceived. In the injection apparatus, the linear motor includes a movable element having a permanent magnet, and a stationary element having coils. Supply of predetermined current to the stationary element causes the movable element to advance and retreat, thereby causing the screw to advance and retreat. In this case, magnetic poles of the permanent magnet are arranged such that N poles and S poles alternate, and the coils are wound in a manner corresponding to the magnetic poles. Accordingly, the drive apparatus can exhibit high-speed performance, high responsiveness, and high control accuracy.

In some cases, the mold clamping apparatus also uses a hydraulic-type or electric-motor-type drive apparatus.

In the hydraulic-type drive apparatus, a mold-clamping cylinder is disposed behind a movable platen, and hydraulic pressure is applied to the hydraulic chamber of the mold-clamping cylinder, thereby causing the movable platen to advance and retreat.

In the electric-motor-type drive apparatus, an electric mold-clamping motor, which is attached to a toggle support disposed behind a movable platen, is activated, and a ball screw converts rotary motion to rectilinear motion so as to cause a crosshead to advance and retreat, thereby causing the movable platen, via a toggle mechanism, to advance and retreat.

However, in the case of the hydraulic-type drive apparatus, in order to apply hydraulic pressure to the hydraulic chamber of the mold-clamping cylinder, a hydraulic circuit must be disposed for supplying the hydraulic chamber oil discharged from a hydraulic pump. In the case of the electric-motor-type drive apparatus, after rotary motion generated through drive of the mold-clamping motor is converted to rectilinear motion, a mold-clamping force must be generated by means of the toggle mechanism. The drive apparatus of either type fails to exhibit high-speed performance, high responsiveness, and high control accuracy.

In order to cope with the above problems, use of a linear motor as a drive apparatus is conceived. In the mold-clamping apparatus, the linear motor includes a movable element having a permanent magnet, and a stationary element having coils. Supply of predetermined current to the stationary element causes the movable element to advance and retreat, thereby causing the crosshead to advance and retreat and thus causing the movable platen to advance and retreat. Also, in this case, magnetic poles of the permanent magnet are arranged such that N poles and S poles alternate, and the coils are wound in a manner corresponding to the magnetic poles. Accordingly, the drive apparatus can exhibit high-speed performance, high responsiveness, and high control accuracy.

However, since the linear motor does not have a decelerating mechanism, use of the linear motor as the conventional drive apparatus; i.e., use of the linear motor as a drive apparatus for an injection molding machine, which is a high-load mechanical apparatus, requires an increase in the capacity of the linear motor in order to generate a large thrust force and to provide short-cycled continuous drive.

The capacity of the linear motor can be increased by increasing the area of the permanent magnet used in the linear motor. However, since the linear motor generally assumes a flat shape, increasing the area of the permanent magnet increases the size of the linear motor, resulting in an increase in not only the size of the drive apparatus, but also the cost of the drive apparatus. Also, when the area of the permanent magnet is increased, the weight of the movable element increases accordingly, resulting in a failure for the drive apparatus to exhibit high-speed performance and high responsiveness.

In the case where the linear motor is used in the injection apparatus, since the linear motor for effecting injection and the metering motor are disposed adjacent to each other on the same straight line, the axial dimension of the injection apparatus increases, resulting in an increase in the size of the injection apparatus.

An object of the present invention is to solve the above-mentioned problems in the conventional drive apparatus and to provide a drive apparatus for an injection molding machine which can generate a large thrust force, can provide short-cycled continuous drive, and can be reduced in size and cost, as well as an injection apparatus and a mold-clamping apparatus.

DISCLOSURE OF THE INVENTION

To achieve the above object, a drive apparatus for an injection molding machine of the present invention is characterized by comprising a housing; a tubular linear motor comprising a movable element disposed within the housing in a manner capable of advancing and retreating, and a stationary element attached to the housing, the linear motor serving as a first drive section; a member-to-be-driven which is advanced and retreated together with the movable element through drive of the linear motor; and a second drive section attached to the housing and disposed such that at least a portion of the second drive section overlaps the linear motor along an axial direction.

In this case, since the movable element and the stationary element constitute the tubular linear motor, the area of a permanent magnet of the movable element can be sufficiently increased by merely a slight increase in a radial dimension. Accordingly, since the capacity of the linear motor can be increased, the linear motor can generate a large thrust force and can provide short-cycled continuous drive. As a result, the drive apparatus can be mounted in a high-load mechanical apparatus, such as an injection molding machine.

Since the second drive section is disposed such that at least a portion of the second drive section overlaps the linear motor along the axial direction, the size of the drive apparatus can be reduced, and the cost of the drive apparatus can be reduced.

Since the stationary element and the second drive section are attached to the housing, when the linear motor is activated, the movable element moves, whereas the second drive section remains stationary. Accordingly, the weight of a movable portion of the drive apparatus is reduced, so that the moment of inertia can be reduced. As a result, the drive apparatus can be further enhanced in terms of high-speed performance, high responsiveness, and high control accuracy.

BEST MODE FOR CARRYING OUT THE INVENTION

The embodiments of the present invention will next be described in detail with reference to the drawings.

Figure 1:
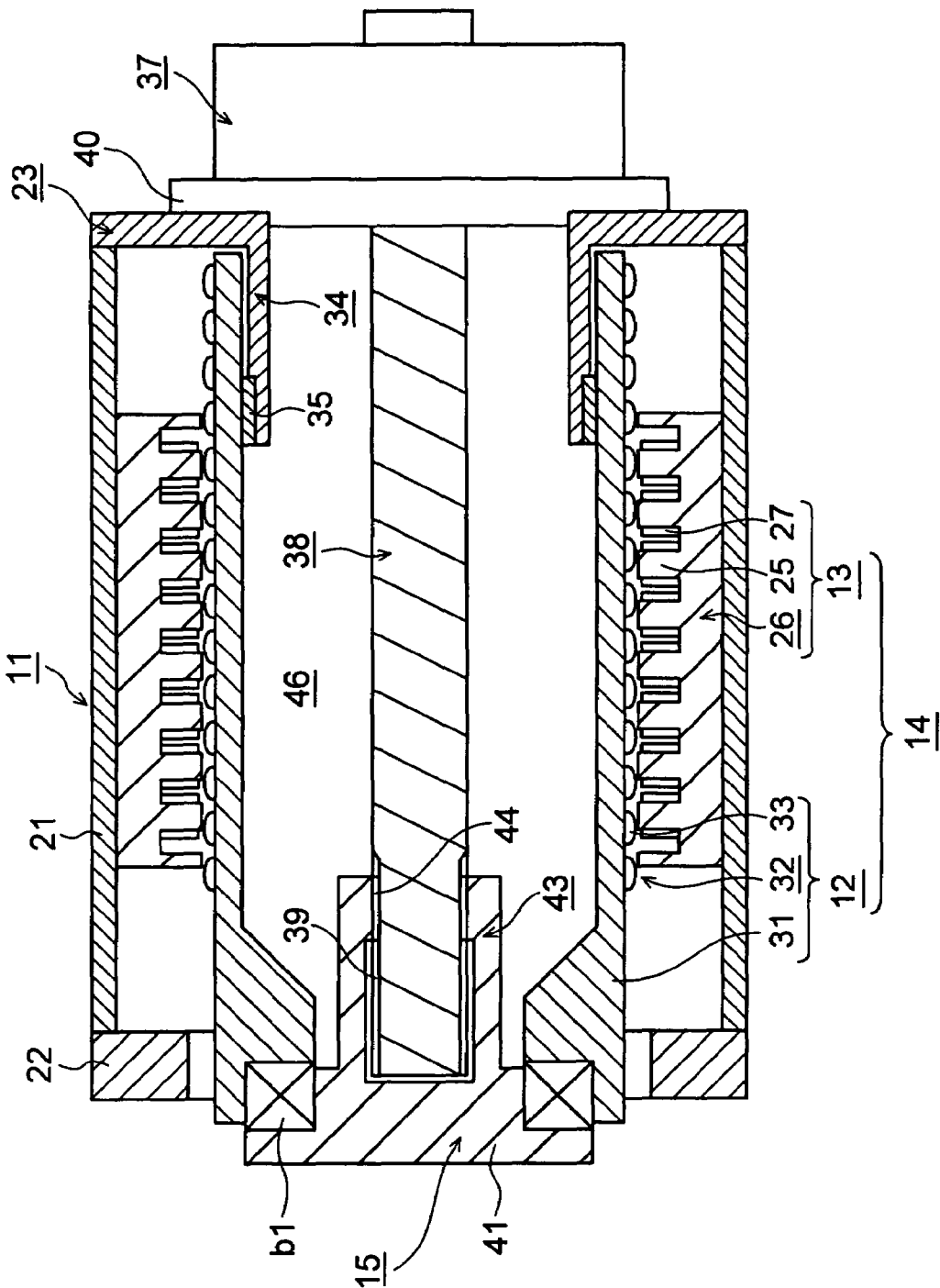
FIG. 1 is a sectional view of a drive apparatus according to a first embodiment of the present invention.

FIG. 1 is a sectional view of a drive apparatus according to a first embodiment of the present invention. In this case, there is described a drive apparatus mounted in a molding machine, which is one type of mechanical apparatus; for example, an injection molding machine.

In the drawing, reference numeral 11 denotes a cylindrical housing; reference numeral 12 denotes a cylindrical, movable element disposed within the housing 11 in a manner capable of axially advancing and retreating (moving in the left-right direction in the drawing); reference numeral 13 denotes a cylindrical stationary element attached to the inner circumferential surface of the housing 11; and reference numeral 15 denotes a member-to-be-driven, which is disposed in a rotatable relationship to the movable element 12 via a bearing b1 and in a manner capable of advancing and retreating together with the movable element 12. An unillustrated movable member is disposed ahead (leftward in the drawing) of the member-to-be-driven 15 in such a manner as to be rotatable and capable of advancing and retreating. The movable element 12 and the stationary element 13 constitute a tubular, in the present embodiment, cylindrical linear motor 14, which serves as a first drive section.

The housing 11 includes a cylindrically tubular portion 21; an annular front plate 22 attached to the front end (left end in the drawing) of the tubular portion 21; and an annular rear plate 23 attached to the rear end (right end in the drawing) of the tubular portion 21. The stationary element 13 is attached to the tubular portion 21 over a predetermined, substantially central range along the axial direction. The stationary element 13 includes a core 26 having a plurality of magnetic-pole teeth 25 formed in a radially inward projecting condition and at predetermined pitch spacings, and coils 27 wound on the corresponding magnetic-pole teeth 25. The core 26 and the coil 27 constitute a stator. The magnetic-pole teeth 25 are formed in parallel with one another and along the circumferential direction of the core 26.

The movable element 12 includes a cylindrical core 31, which is disposed radially inward of the stationary element 13, and a permanent magnet 32, which is disposed on the outer circumferential surface of the core 31 and over a predetermined axial range; specifically, a distance of the axial length of the core 26 plus the stroke of the member-to-be-driven 15. The permanent magnet 32 is magnetized such that magnetic poles 33 serving as N pole and magnetic poles 33 serving as S pole are alternately formed at the same pitch spacings as those of the magnetic-pole teeth 25. The magnetic poles 33 are formed in parallel with one another and along the circumferential direction of the core 31. The core 26 and the coils 27 constitute a first drive element, and the permanent magnet 32 constitutes a second drive element.

In order to support the movable element 12 in an axially movable relationship to the housing 11, unillustrated guide rails, which serve as guide members, are disposed in an axially extending manner on the housing 11 at circumferentially predetermined positions. The movable element 12 is caused to move along the guide rails. A tubular support portion 34 is formed on the rear plate 23 in a manner projecting frontward from the inner circumferential edge of the rear plate 23 by a length equal to the stroke of the member-to-be-driven 15. A slide portion 35 is formed on the outer circumferential surface of the front end of the support portion 34. In this case, a bush or a self-lubricating material, which does not require application of lubricant, can be used to form the slide portion 35. The support portion 34 supports the movable element 12 such that the inner circumferential surface of the core 31 slides on the slide portion 35. Also, in this manner, the support portion 34 positions the movable element 12 in relation to the stationary element 13. In this case, preferably, in order to enhance positioning accuracy, the support portion 34 is formed integrally with the rear plate 23. However, the support portion 34 may be formed as a separate member. Also, a slide portion may be formed on the inner circumferential surface of the front plate 22. In this case, the support portion supports the movable element 12 such that the outer circumferential surface of the core 31 slides on the slide portion.

Meanwhile, the linear motor 14 can be driven through supply of predetermined current; for example, U-phase, V-phase, and W-phase currents, to the coils 27, whereby the movable element 12 can be moved axially, and the member-to-be-driven 15 can be advanced and retreated together with the movable element 12. In order to drive the linear motor 14, an unillustrated control section is disposed, and an unillustrated inverter is connected to the coils 27. A drive-processing means of the control section performs a drive process so as to generate a predetermined drive signal, and supplies the drive signal to the inverter. Upon reception of the drive signal, the inverter generates currents of the above-mentioned phases and supplies the currents to the coils 27. In this case, in accordance with the drive signal, the inverter can change patterns of generating the currents of the above-mentioned phases so as to drive the linear motor 14 in the regular direction for causing the movable element 12 to advance (move leftward in the drawing), or to drive the linear motor 14 in the reverse direction for causing the movable element 12 to retreat (move rightward in the drawing).

As a result, thrust force can be generated through drive of the linear motor 14, and the thrust force can be transmitted to the member-to-be-driven 15. A small clearance is formed between the movable element 12 and the stationary element 13. The present embodiment can render the clearance very small, since the core 31 is positioned in the radially inward direction by means of the support portion 34. Therefore, the thrust force can be increased accordingly.

Since the support portion 34 is disposed radially inward of the movable element 12, the movable element 12 and the support portion 34 can be disposed in an overlapping condition along the axial direction. Thus, the size of the drive apparatus can be reduced.

In order to rotate the member-to-be-driven 15, an electric motor 37, such as a servomotor, which serves as a rotary, second drive section, is attached to the rear end face (right end face in the drawing) of the rear plate 23 via a flange 40, which serves as a mounting portion, and projects rearward (rightward in the drawing). The motor 37 is of an inner rotor type and includes an unillustrated stator and an unillustrated rotor, which is rotatably disposed radially inward of the stator. The motor 37 can be driven through supply of predetermined current; for example, U-phase, V-phase, and W-phase currents, to the stator, whereby the member-to-be-driven 15 can be rotated, and the screw can be rotated.

To achieve the above operation, a space 46 having a predetermined shape; in the present embodiment, a cylindrical shape, is formed within the movable element 12. An output shaft 38 of the motor 37 is disposed at the center within the space 46 and extends frontward. Splines 39 are formed on the outer circumferential surface of the front end of the output shaft 38 and serve as a driving transmission element having the same length as the stroke of the member-to-be-driven 15.

The member-to-be-driven 15 includes a disk-like base portion 41 and a tubular holder portion 43, which projects rearward from the base portion 41 over a distance equal to the stroke of the member-to-be-driven 15. Splines 44 are formed on the inner circumferential surface of the rear end of the holder portion 43 and spline-engaged with the splines 39 so as to serve as a driven transmission element. The splines 39 and 44 constitute a rotation transmission section. The rotation transmission section transmits, to the member-to-be-driven 15, rotation generated through drive of the motor 37 and output to the output shaft 38, and allows axial movement of the member-to-be-driven 15 in relation to the output shaft 38. In this case, even when transmission of rotation to the movable element 12 via the bearing b1 is attempted as the member-to-be-driven 15 is rotated, the guide rails prevent rotation of the movable element 12. In other words, the guide rails function as a rotation stop.

Next, the operation of the thus-configured drive apparatus will be described.

When the drive-processing means causes the motor 37 to rotate in the regular direction, the output shaft 38 is rotated in the regular direction. Rotation of the output shaft 38 is transmitted to the member-to-be-driven 15 via the splines 39 and 44. As a result, the movable member is rotated.

Also, the drive-processing means drives the linear motor 14 so as to generate a predetermined thrust force, to thereby advance the movable element 12. As a result, the member-to-be-driven 15 is advanced, and thus, the movable member is advanced.

Thus, use of the linear motor 14 enables the drive apparatus to exhibit high-speed performance, high responsiveness, and high control accuracy. The movable element 12 and the stationary element 13 constitute the tubular linear motor 14. At least a portion of the motor 37; in the present embodiment, not only the output shaft 38 but also the splines 39 and 44, are accommodated in the space 46. Thus, the linear motor 14, the output shaft 38, and the rotation transmission section can be disposed in an overlapping condition along the axial direction. Accordingly, the axial dimension of the drive apparatus can be reduced, and thus the size of the drive apparatus can be reduced, with a resultant reduction in the cost of the drive apparatus.

Since the movable element 12 and the stationary element 13 constitute the tubular linear motor 14, the area of the permanent magnet 32 can be sufficiently increased by merely a slight increase in a radial dimension. Accordingly, since the capacity of the linear motor 14 can be increased, the linear motor 14 can generate a large thrust force and can provide short-cycled continuous drive. As a result, the drive apparatus can be mounted in a high-load mechanical apparatus, such as an injection molding machine.

Since the stationary element 13 and the motor 37 are attached to the housing 11, when the linear motor 14 is driven, the movable element 12 moves, whereas the motor 37 remains stationary. Accordingly, the weight of a movable portion of the drive apparatus is reduced, so that the moment of inertia can be reduced. As a result, the drive apparatus can be further enhanced in terms of high-speed performance, high responsiveness, and high control accuracy.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape. The polygon includes a shape having a plurality of internal angles, such as triangle, quadrangle, and pentagon.

Next, a second embodiment of the present invention will be described. Like structural elements of the first and second embodiments are denoted by like reference numerals, and repeated description thereof is omitted. For the effect that the second embodiment yields through employment of structural elements similar to those of the first embodiment, its description is omitted, and the description of the effect of the first embodiment is incorporated herein by reference.

Figure 2:
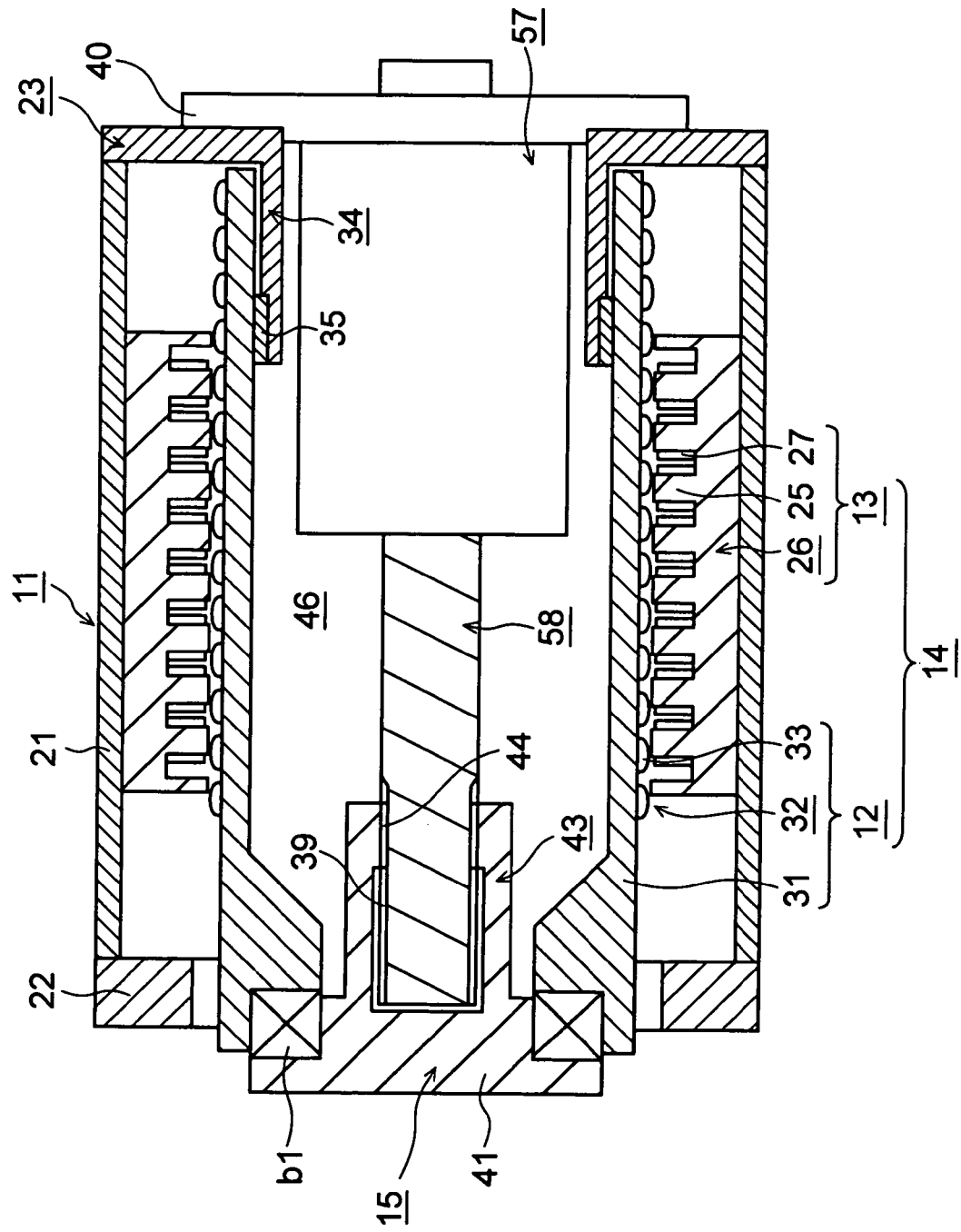
FIG. 2 is a sectional view of a drive apparatus according to a second embodiment of the present invention.

FIG. 2 is a sectional view of a drive apparatus according to the second embodiment of the present invention.

In this case, in order to rotate the member-to-be-driven 15, an electric motor 57, such as a servomotor, which serves as a rotary, second drive section, is attached to the rear end face (right end face in the drawing) of the rear plate 23 via the flange 40, which serves as a mounting portion, and projects frontward (leftward in the drawing). The motor 57 is of an inner rotor type and includes an unillustrated stator and an unillustrated rotor, which is rotatably disposed radially inward of the stator. The motor 57 is driven through supply of predetermined current; for example, U-phase, V-phase, and W-phase currents, to the stator, whereby the member-to-be-driven 15 can be rotated, and the movable member can be rotated.

To achieve the above operation, an output shaft 58 of the motor 57 is disposed at the center within the space 46 and extends frontward. The splines 39 are formed on the outer circumferential surface of the front end (left end in the drawing) of the output shaft 58 and serve as a driving transmission element having the same length as the stroke of the member-to-be-driven 15.

In this case, at least a portion of the motor 57; in the present embodiment, not only the stator, the rotor, the output shaft 58, and the like of the motor 57 but also the rotation transmission section composed of the splines 39 and 44, is accommodated in the space 46. Thus, the cylindrical linear motor 14 serving as the first drive section, the stator, the rotor, the output shaft 58, and the like of the motor 57, and the rotation transmission section can be disposed in an overlapping condition along the axial direction. Accordingly, the axial dimension of the drive apparatus can further be reduced, and thus the size of the drive apparatus can further be reduced, with a resultant further reduction in the cost of the drive apparatus.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape. The core 26 and the coils 27 constitute a first drive element, and the permanent magnet 32 constitutes a second drive element.

Next, a third embodiment of the present invention will be described. Like structural elements of the first and third embodiments are denoted by like reference numerals, and repeated description thereof is omitted. For the effect that the third embodiment yields through employment of structural elements similar to those of the first embodiment, its description is omitted, and the description of the effect of the first embodiment is incorporated herein by reference.

Figure 3:
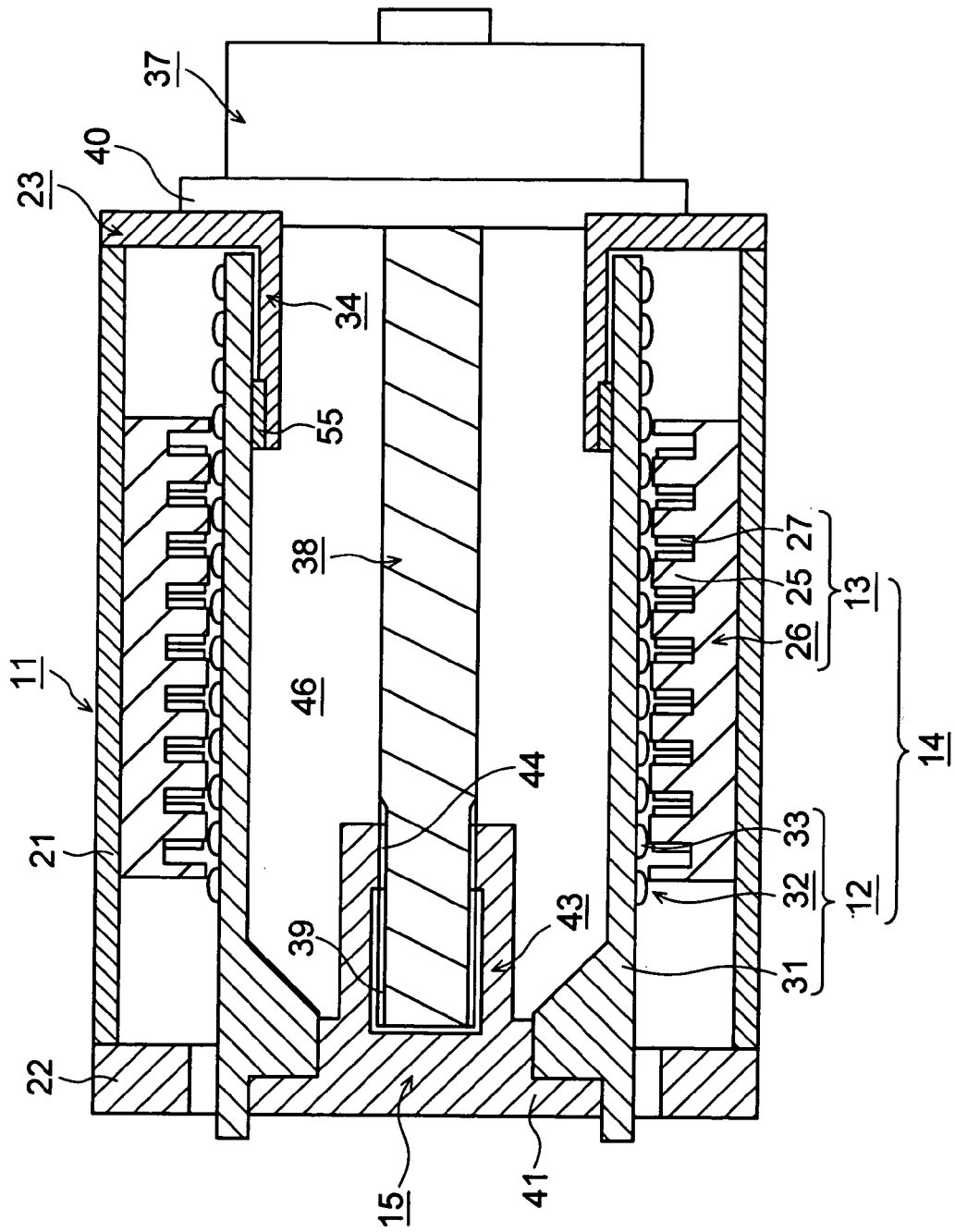
FIG. 3 is a sectional view of a drive apparatus according to a third embodiment of the present invention.

FIG. 3 is a sectional view of a drive apparatus according to the third embodiment of the present invention.

In this case, the movable element 12 and the member-to-be-driven 15 are fixed to each other and are disposed in a rotatable relationship to the housing 11 and in a manner capable of advancing and retreating (moving in the left-right direction in the drawing) in relation to the housing 11. In order to allow such movements, a support member 55, such as a linear ball bearing, is disposed on the outer circumferential surface of the front end (left end in the drawing) of the support portion 34 so as to support the movable member 12 such that the movable member 12 is movable in the axial direction and in the circumferential direction. Also, an unillustrated support member, such as a linear ball bearing, is disposed on the inner circumferential surface of the front plate 22 so as to support the movable element 12 such that the movable member 12 is movable in the axial direction and in the circumferential direction. No guide rails are disposed on the housing 11. The core 26 and the coils 27 constitute a first drive element, and the permanent magnet 32 constitutes a second drive element.

In this case, the drive-processing means can perform a driving process for driving the tubular linear motor 14, which serves as the first drive section, while stopping the drive of the motor 37, which serves as the second drive section, so as to cause the member-to-be-driven 15 to advance and retreat without rotating; driving the motor 37, while stopping the drive of the linear motor 14, so as to rotate the member-to-be-driven 15 without causing the member-to-be-driven 15 to advance and retreat; and driving the linear motor 14 and the motor 37 so as to cause the member-to-be-driven 15 to advance and retreat while rotating.

When the member-to-be-driven 15 is caused to advance and retreat, the motor 37 can be placed in a driven state so as to prevent rotation of the member-to-be-driven 15. Also, when the member-to-be-driven 15 is caused to rotate, the linear motor 14 can be placed in a driven state so as to prevent the member-to-be-driven 15 from advancing and retreating. Alternatively, each of the motor 37 and the linear motor 14 can be provided with a brake so as to be placed in a braked state in place of being placed in a driven state.

Next, a fourth embodiment of the present invention will be described. Like structural elements of the second and fourth embodiments are denoted by like reference numerals, and repeated description thereof is omitted. For the effect that the fourth embodiment yields through employment of structural elements similar to those of the second embodiment, its description is omitted, and the description of the effect of the second embodiment is incorporated herein by reference.

Figure 4:
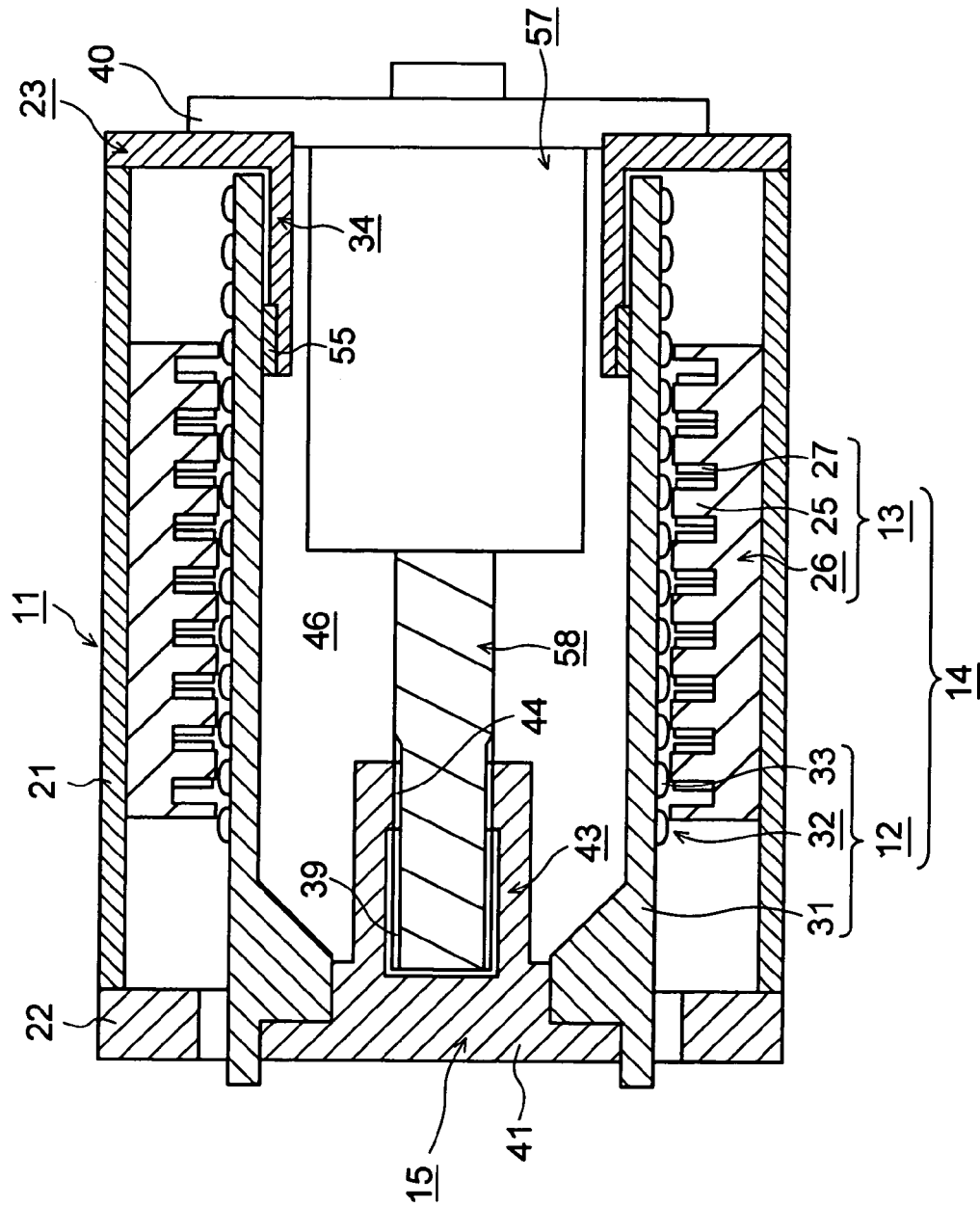
FIG. 4 is a sectional view of a drive apparatus according to a fourth embodiment of the present invention.

FIG. 4 is a sectional view of a drive apparatus according to the fourth embodiment of the present invention.

In this case, in order to rotate the member-to-be-driven 15, an electric motor 57, such as a servomotor, which serves as the rotary, second drive section, is attached to the rear end face (right end face in the drawing) of the rear plate 23 via the flange 40, which serves as a mounting portion, and projects frontward (leftward in the drawing). The motor 57 is of an inner rotor type and includes an unillustrated stator and an unillustrated rotor, which is rotatably disposed radially inward of the stator. The motor 57 can be driven through supply of predetermined current; for example, U-phase, V-phase, and W-phase currents, to the stator, whereby the member-to-be-driven 15 can be rotated, and the movable member can be rotated.

To achieve the above operation, the output shaft 58 of the motor 57 is disposed at the center within the space 46 and extends frontward. The splines 39 are formed on the outer circumferential surface of the front end (left end in the drawing) of the output shaft 58 and serve as the driving transmission element having the same length as the stroke of the member-to-be-driven 15.

The movable element 12 and the member-to-be-driven 15 are fixed to each other and are disposed in a rotatable relationship to the housing 11 and in a manner capable of advancing and retreating (moving in the left-right direction in the drawing) in relation to the housing 11. Thus, the support member 55, such as a linear ball bearing, is disposed on the outer circumferential surface of the front end of the support portion 34 in order to support the movable member 12 such that the movable member 12 is movable in the axial direction and in the circumferential direction. Also, an unillustrated support member, such as a linear ball bearing, is disposed on the inner circumferential surface of the front plate 22 in order to support the movable element 12 such that the movable member 12 is movable in the axial direction and in the circumferential direction. No guide rails are disposed on the housing 11. The core 26 and the coils 27 constitute a first drive element, and the permanent magnet 32 constitutes a second drive element.

In this case, at least a portion of the motor 57; in the present embodiment, not only the stator, the rotor, the output shaft 58, and the like of the motor 57 but also the rotation transmission section composed of the splines 39 and 44, is accommodated in the space 46. Thus, the cylindrical linear motor 14 serving as the first drive section, the stator, the rotor, the output shaft 58, and the like of the motor 57, and the rotation transmission section can be disposed in an overlapping condition along the axial direction. Accordingly, the axial dimension of the drive apparatus can further be reduced, and thus the size of the drive apparatus can further be reduced, with a resultant further reduction in the cost of the drive apparatus.

The drive-processing means can perform a driving process for driving the linear motor 14, while stopping the drive of the motor 57, so as to cause the member-to-be-driven 15 to advance and retreat without rotating; driving the motor 57, while stopping the drive of the linear motor 14, so as to rotate the member-to-be-driven 15 without causing the member-to-be-driven 15 to advance and retreat; and driving the linear motor 14 and the motor 57 so as to cause the member-to-be-driven 15 to advance and retreat while rotating.

When the member-to-be-driven 15 is caused to advance and retreat, the motor 57 can be placed in a driven state so as to prevent rotation of the member-to-be-driven 15. Also, when the member-to-be-driven 15 is caused to rotate, the linear motor 14 can be placed in a driven state so as to prevent the member-to-be-driven 15 from advancing and retreating. Alternatively, each of the motor 57 and the linear motor 14 can be provided with a brake so as to be placed in a braked state in place of being placed in a driven state.

Next, a fifth embodiment of the present invention will be described. Like structural elements of the first and fifth embodiments are denoted by like reference numerals, and repeated description thereof is omitted. For the effect that the fifth embodiment yields through employment of structural elements similar to those of the first embodiment, its description is omitted, and the description of the effect of the first embodiment is incorporated herein by reference.

Figure 5:
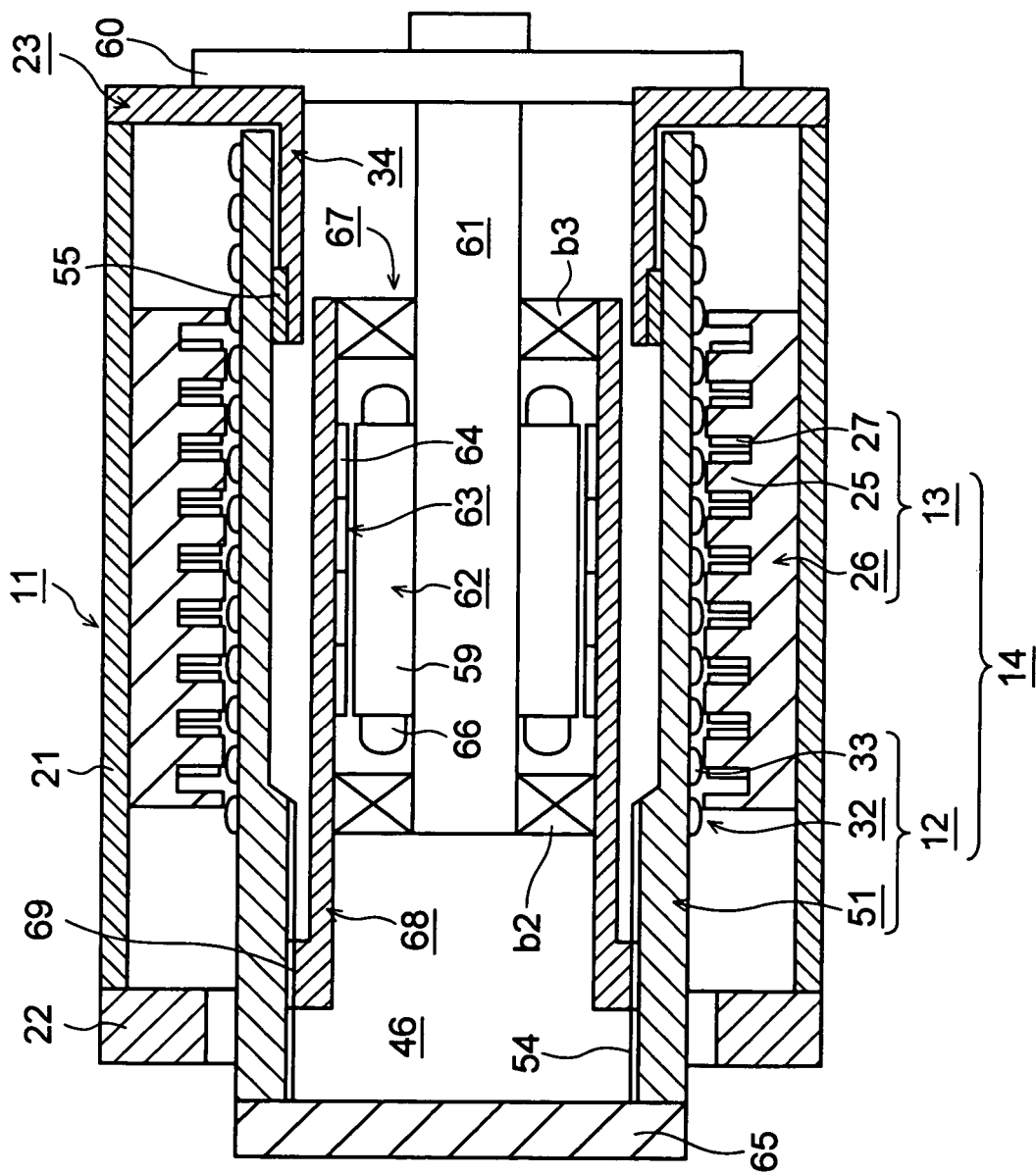
FIG. 5 is a sectional view of a drive apparatus according to a fifth embodiment of the present invention.

FIG. 5 is a sectional view of a drive apparatus according to the fifth embodiment of the present invention.

In the drawing, reference numeral 12 denotes a cylindrical, movable element disposed within the housing 11 rotatably and in a manner capable of axially advancing and retreating (moving in the left-right direction in the drawing); reference numeral 13 denotes a cylindrical stationary element attached to the inner circumferential surface of the housing 11; and reference numeral 65 denotes a member-to-be-driven, which is fixed to the movable element 12 and disposed such that the member-to-be-driven, together with the movable element 12, is rotatable and can advance and retreat in relation to the housing 11. The movable element 12 includes a cylindrical core 51, which is disposed radially inward of the stationary element 13, and a permanent magnet 32, which is disposed on the outer circumferential surface of the core 51 and over a predetermined axial range; specifically, a distance of the axial length of the core 26 plus the stroke of the member-to-be-driven 65. The core 26 and the coils 27 constitute a first drive element, and the permanent magnet 32 constitutes a second drive element.

In order to support the movable member 12 such that the movable member 12 is rotatable and can advance and retreat, the support member 55, such as a linear ball bearing, is disposed on the outer circumferential surface of the front end (left end in the drawing) of the support portion 34 so as to support the movable member 12 such that the movable member 12 is movable in the axial direction and in the circumferential direction. Also, an unillustrated support member, such as a linear ball bearing, is disposed on the inner circumferential surface of the front plate 22 so as to support the movable element 12 such that the movable member 12 is movable in the axial direction and in the circumferential direction. No guide rails are disposed on the housing 11.

In order to rotate the member-to-be-driven 65, an electric motor 67, such as a servomotor, which serves as a rotary, second drive section, is attached to the rear end face (right end face in the drawing) of the rear plate 23 via a flange 60, which serves as a mounting portion, and projects frontward (leftward in the drawing). The motor 67 is of an outer rotor type and includes a support shaft 61, which projects frontward from the flange 60 and is disposed at the center within the space 46; a tubular, hollow output shaft 68, which surrounds the support shaft 61 and is disposed in a rotatable relationship to the support shaft 61; a stator 62, which is attached to the outer circumferential surface of the support shaft 61; and a rotor 63, which is disposed rotatably and radially outward of the stator 62. Reference numerals b2 and b3 denote bearings.

The stator 62 includes a core 59 attached to the support shaft 61, and coils 66 wound on the core 59. The rotor 63 includes a core that serves as the output shaft 68, and a permanent magnet 64 attached to the core. The motor 67 can be driven through supply of predetermined current; for example, U-phase, V-phase, and W-phase currents, to the coils 66, whereby the member-to-be-driven 65 can be rotated, and an unillustrated movable member attached to the member-to-be-driven 65 can be rotated.

To achieve the above operation, the output shaft 68 is disposed within the space 46 and extends frontward, and splines 69 are formed on the outer circumferential surface of the front end of the output shaft 68 and serve as a driving transmission element. Splines 54 are formed on the inner circumferential surface of a front end portion (left end portion in the drawing) of the core 51 along a length equal to or longer than the stroke of the member-to-be-driven 65 and spline-engaged with the splines 69 so as to serve as a driven transmission element. The splines 69 and 54 constitute a rotation transmission section. The rotation transmission section transmits, to the member-to-be-driven 65, rotation generated through drive of the motor 67 and output to the output shaft 68, and allows axial movement of the member-to-be-driven 65 in relation to the output shaft 68.

In this case, at least a portion of the motor 67; in the present embodiment, not only the support shaft 61, the stator 62, the rotor 63, the output shaft 68, and the like of the motor 67 but also the rotation transmission section, is accommodated in the space 46. Thus, the cylindrical linear motor 14 serving as the first drive section, the support shaft 61, the stator 62, the rotor 63, the output shaft 68, and the like of the motor 67, and the rotation transmission section can be disposed in an overlapping condition along the axial direction. Accordingly, the axial dimension of the drive apparatus can further be reduced, and thus the size of the drive apparatus can further be reduced, with a resultant further reduction in the cost of the drive apparatus.

The drive-processing means can perform a driving process for driving the linear motor 14, while stopping the drive of the motor 67, so as to cause the member-to-be-driven 65 to advance and retreat without rotating; driving the motor 67, while stopping the drive of the linear motor 14, so as to rotate the member-to-be-driven 65 without causing the member-to-be-driven 65 to advance and retreat; and driving the linear motor 14 and the motor 67 so as to cause the member-to-be-driven 65 to advance and retreat while rotating.

When the member-to-be-driven 65 is caused to advance and retreat, the motor 67 can be placed in a driven state so as to prevent rotation of the member-to-be-driven 65. Also, when the member-to-be-driven 65 is caused to rotate, the linear motor 14 can be placed in a driven state so as to prevent the member-to-be-driven 65 from advancing and retreating. Alternatively, each of the motor 67 and the linear motor 14 can be provided with a brake so as to be placed in a braked state in place of being placed in a driven state.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape.

Next, a sixth embodiment of the present invention will be described. Like structural elements of the fifth and sixth embodiments are denoted by like reference numerals, and repeated description thereof is omitted. For the effect that the sixth embodiment yields through employment of structural elements similar to those of the fifth embodiment, its description is omitted, and the description of the effect of the fifth embodiment is incorporated herein by reference.

Figure 6:
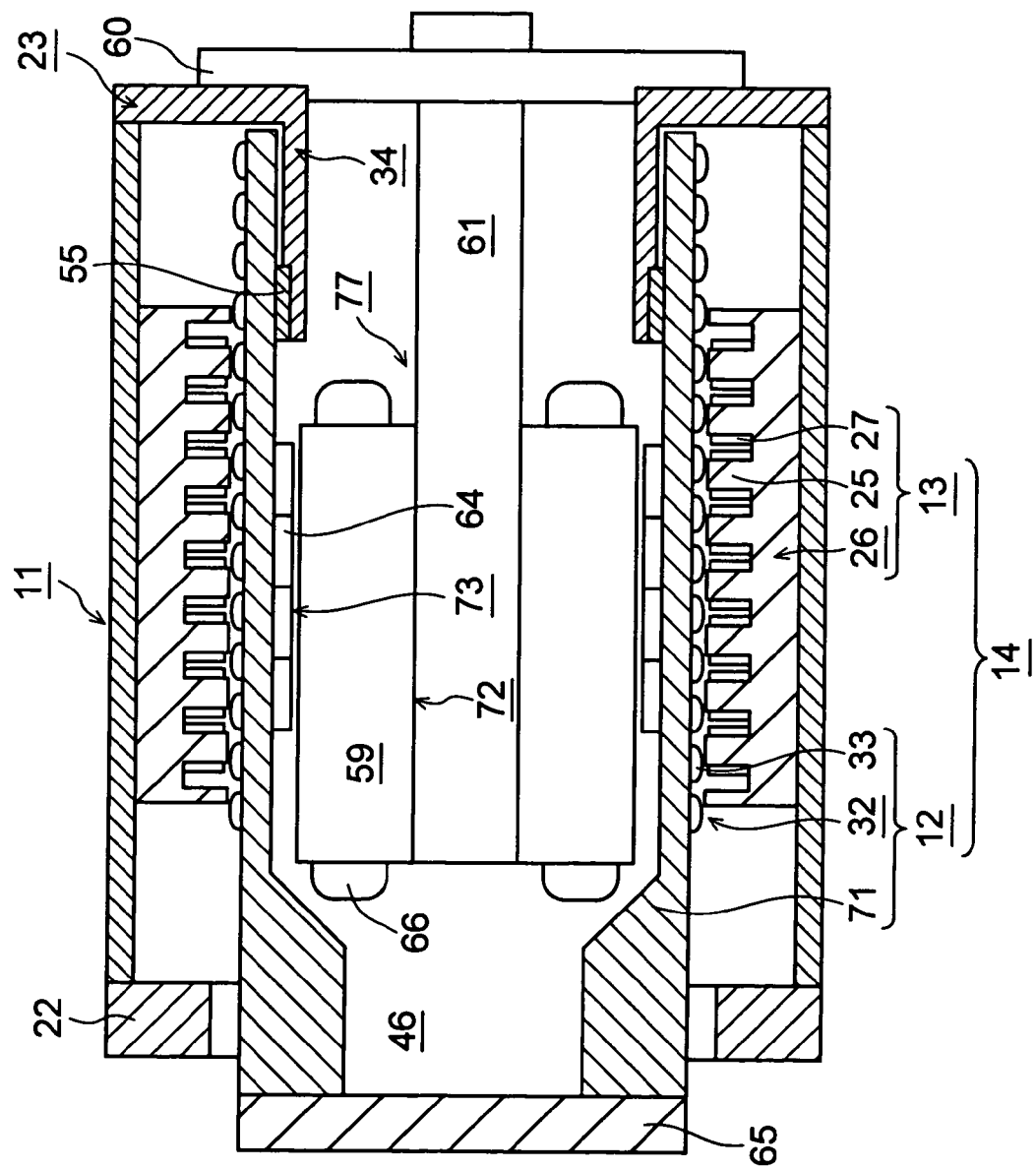
FIG. 6 is a sectional view of a drive apparatus according to a sixth embodiment of the present invention.

FIG. 6 is a sectional view of a drive apparatus according to the sixth embodiment of the present invention.

In the drawing, reference numeral 12 denotes a cylindrical, movable element disposed within the housing 11 rotatably and in a manner capable of axially advancing and retreating (moving in the left-right direction in the drawing); reference numeral 13 denotes a cylindrical stationary element attached to the inner circumferential surface of the housing 11; and reference numeral 65 denotes a member-to-be-driven, which is fixed to the movable element 12 and disposed such that the member-to-be-driven, together with the movable element 12, is rotatable and can advance and retreat in relation to the housing 11. The movable element 12 includes a cylindrical core 71, which is disposed radially inward of the stationary element 13, and a permanent magnet 32, which is disposed on the outer circumferential surface of the core 71 and over a predetermined axial range; specifically, a distance of the axial length of the core 26 plus the stroke of the member-to-be-driven 65. The core 26 and the coils 27 constitute a first drive element, and the permanent magnet 32 constitutes a second drive element.

In order to support the movable member 12 such that the movable member 12 is rotatable and can advance and retreat, the support member 55, such as a linear ball bearing, is disposed on the outer circumferential surface of the front end (left end in the drawing) of the support portion 34 so as to support the movable member 12 such that the movable member 12 is movable in the axial direction and in the circumferential direction. Also, an unillustrated support member, such as a linear ball bearing, is disposed on the inner circumferential surface of the front plate 22 so as to support the movable element 12 such that the movable member 12 is movable in the axial direction and in the circumferential direction. No guide rails are disposed on the housing 11.

In order to rotate the member-to-be-driven 65, an electric motor 77, such as a servomotor, which serves as a rotary, second drive section, is attached to the rear end face (right end face in the drawing) of the rear plate 23 via the flange 60, which serves as a mounting portion, and projects frontward (leftward in the drawing). The motor 77 is of an outer rotor type and includes the support shaft 61, which projects frontward from the flange 60 and is disposed at the center within the space 46; a tubular, hollow output shaft, which serves as the core 71, surrounds the support shaft 61, and is disposed in a rotatable relationship to the support shaft 61; a stator 72, which is attached to the outer circumferential surface of the support shaft 61; and a rotor 73, which is disposed rotatably and radially outward of the stator 72.

The stator 72 includes the core 59 attached to the support shaft 61, and the coils 66 wound on the core 59. The rotor 73 includes the core 71 that serves as the output shaft, and the permanent magnet 64 attached to the core 71. The motor 77 can be driven through supply of predetermined current; for example, U-phase, V-phase, and W-phase currents, to the coils 66, whereby the member-to-be-driven 65 can be rotated, and thus, the aforementioned movable member can be rotated. The stator 72 is disposed over a distance of the axial length of the permanent magnet 64 plus the stroke of the member-to-be-driven 65.

In this case, at least a portion of the motor 77; in the present embodiment, the support shaft 61, the stator 72, the rotor 73, and the like of the motor 77, are accommodated in the space 46. Thus, the cylindrical linear motor 14 serving as the first drive section, and the support shaft 61, the stator 72, the rotor 73, and the like of the motor 77 can be disposed in an overlapping condition along the axial direction. Accordingly, the axial dimension of the drive apparatus can further be reduced, and thus the size of the drive apparatus can further be reduced, with a resultant further reduction in the cost of the drive apparatus.

The drive-processing means can perform a driving process for driving the linear motor 14, while stopping the drive of the motor 77, so as to cause the member-to-be-driven 65 to advance and retreat without rotating; driving the motor 77, while stopping the drive of the linear motor 14, so as to rotate the member-to-be-driven 65 without causing the member-to-be-driven 65 to advance and retreat; and driving the linear motor 14 and the motor 77 so as to cause the member-to-be-driven 65 to advance and retreat while rotating.

When the member-to-be-driven 65 is caused to advance and retreat, the motor 77 can be placed in a driven state so as to prevent rotation of the member-to-be-driven 65. Also, when the member-to-be-driven 65 is caused to rotate, the linear motor 14 can be placed in a driven state so as to prevent the member-to-be-driven 65 from advancing and retreating. Alternatively, each of the motor 77 and the linear motor 14 can be provided with a brake so as to be placed in a braked state in place of being placed in a driven state.

In this case, since the core 71 serves as the output shaft of the motor 77, not only the size but also the weight of the drive apparatus can be reduced.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape.

Next, a seventh embodiment of the present invention will be described.

Figure 7:
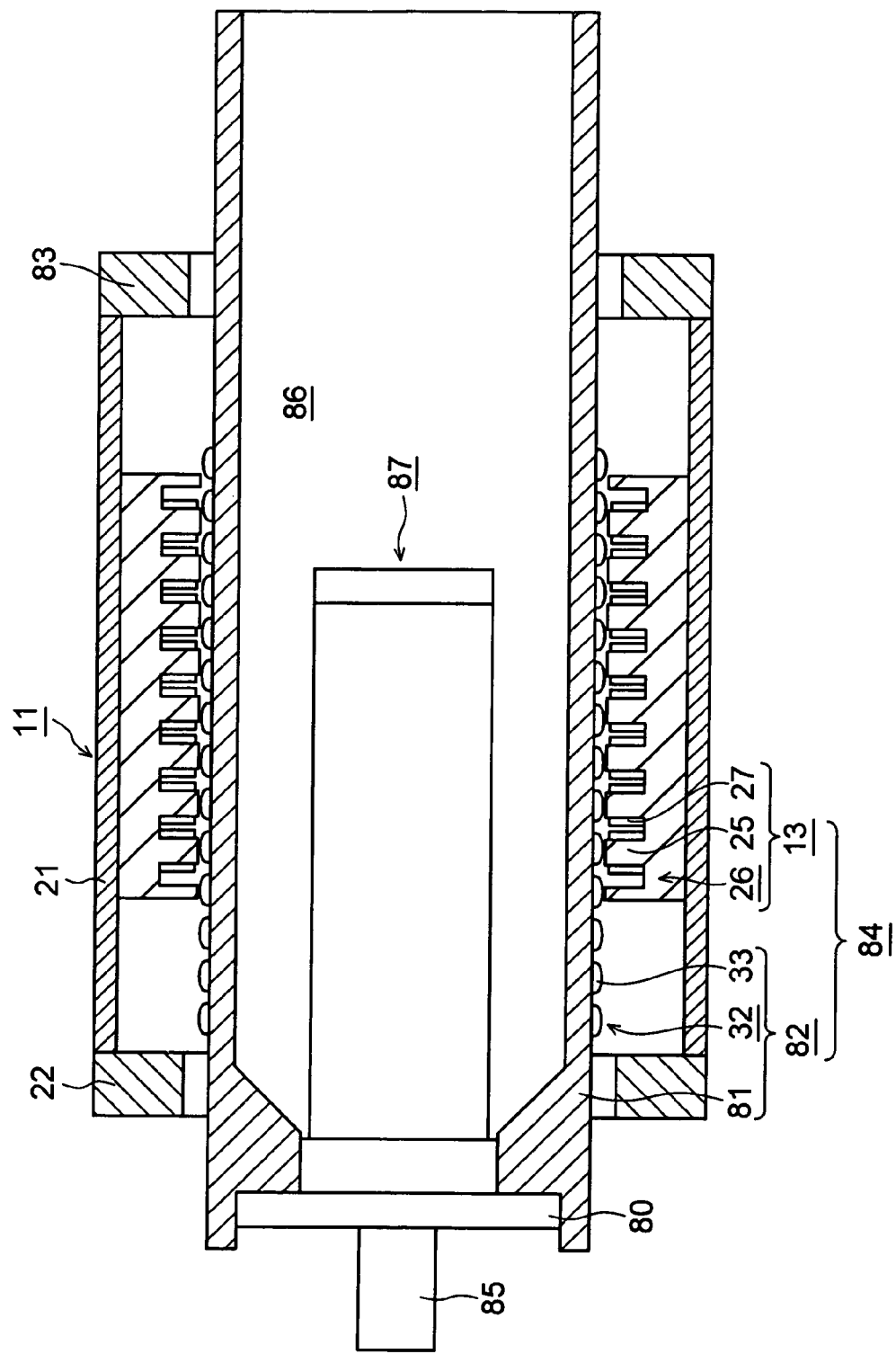
FIG. 7 is a sectional view of a drive apparatus according to a seventh embodiment of the present invention.

FIG. 7 is a sectional view of a drive apparatus according to the seventh embodiment of the present invention.

In the drawing, reference numeral 11 denotes a cylindrical housing; reference numeral 82 denotes a cylindrical, movable element disposed within the housing 11 in a manner capable of axially advancing and retreating (moving in the left-right direction in the drawing); reference numeral 13 denotes a cylindrical stationary element attached to the inner circumferential surface of the housing 11; and reference numeral 85 denotes a member-to-be-driven, which is attached to the front end (left end in the drawing) of the movable element 82 and disposed in a manner capable of advancing and retreating together with the movable element 82. The movable element 82 and the stationary element 13 constitute a tubular linear motor 84, which serves as the first drive section.

The housing 11 includes the cylindrically tubular portion 21; the annular front plate 22 attached to the front end of the tubular portion 21; and an annular rear plate 83 attached to the rear end (right end in the drawing) of the tubular portion 21.

The stationary element 13 is attached to the tubular portion 21 over a predetermined, substantially central range along the axial direction.

The movable element 82 includes a cylindrical core 81, which is disposed radially inward of the stationary element 13, and a permanent magnet 32, which is disposed on the outer circumferential surface of the core 31 and over a predetermined axial range; specifically, a distance of the axial length of the core 26 plus the stroke of the member-to-be-driven 85. The core 26 and the coils 27 constitute a first drive element, and the permanent magnet 32 constitutes a second drive element.

In order to support the movable element 82 in an axially movable relationship to the housing 11, unillustrated guide rails, which serve as guide members, are disposed in an axially extending manner on the housing 11 at circumferentially predetermined positions. The movable element 82 is caused to move along the guide rails. Notably, it is possible to dispose an unillustrated slide portion on the inner circumferential surface of each of the front plate 22 and the rear plate 83 so as to support the movable member 82 such that the outer circumferential surface of the core 81 slides on the slide portions.

Thus, thrust force can be generated through drive of the linear motor 84, whereby the member-to-be-driven 85 can be advanced (moved leftward in the drawing) by the thrust force.

In order to increase thrust force to be applied to the member-to-be-driven 85, the linear motor 87, which serves as a linear-motion-type second drive section, is attached to the front end of the core 81 via a flange 80, which serves as a mounting portion, and extends rearward (rightward in the drawing) within a cylindrical space 86 at the center thereof.

As in the case of the linear motor 84, the linear motor 87 includes an unillustrated movable element connected to the member-to-be-driven 85 and an unillustrated stationary element. The drive-processing means performs a driving process for the linear motor 87 independently of the linear motor 84. Specifically, the linear motor 87 can be driven through supply of predetermined current; for example, U-phase, V-phase, and W-phase currents, to the coils of the stationary element, whereby the movable element and the member-to-be-driven 85 can be advanced and retreated. Through drive of the linear motor 84 in the regular direction, thrust force can be applied to the member-to-be-driven 85.

A hydraulic cylinder, a pneumatic cylinder, or the like that serves as the second drive section can be disposed within the space 86 as is the linear motor 87. In the drawing, reference numeral 25 denotes magnetic-pole teeth, and reference numeral 33 denotes magnetic poles.

In this case, the linear motor 84 transmits force through a magnetic field (air). Therefore, when supply of phase currents is stopped with resultant disappearance of the magnetic field, the movable element 82 can be freely moved. Accordingly, not only does the linear motor 84 enable the drive apparatus to exhibit high-speed performance, high responsiveness, and high control accuracy, but also the linear motor 87 can sufficiently increase thrust force. As a result, the drive apparatus can be mounted in a high-load mechanical apparatus.

In the present embodiment, either an action source or a reaction source of the linear motor 87 is fixed to the movable element 82.

In the present embodiment, the movable element 82 and the stationary element 13 are cylindrical, and the movable element 82 and the stationary element 13 constitute the cylindrical linear motor 84. However, the cross sections of the movable element 82 and the stationary element 13 may assume another shape; for example, a polygonal shape, whereby the movable element 82 and the stationary element 13 can constitute a linear motor having a tubular shape; for example, a polygonally tubular shape.

Next, an eighth embodiment of the present invention will be described. Like structural elements of the first and eighth embodiments are denoted by like reference numerals, and repeated description thereof is omitted. For the effect that the eighth embodiment yields through employment of structural elements similar to those of the first embodiment, its description is omitted, and the description of the effect of the first embodiment is incorporated herein by reference.

Figure 8:
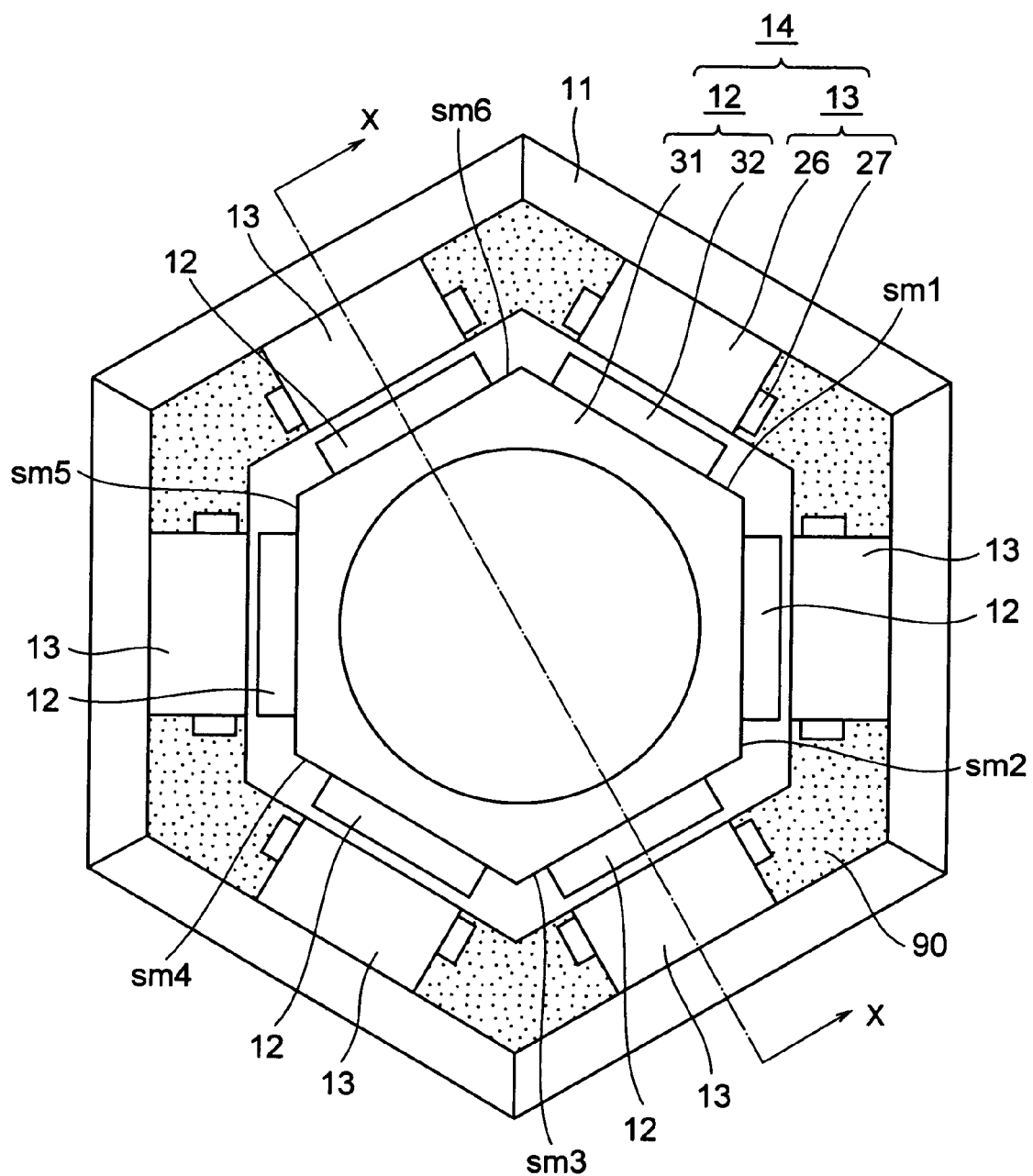
FIG. 8 is a cross-sectional view of a drive apparatus according to an eighth embodiment of the present invention.
Figure 9:
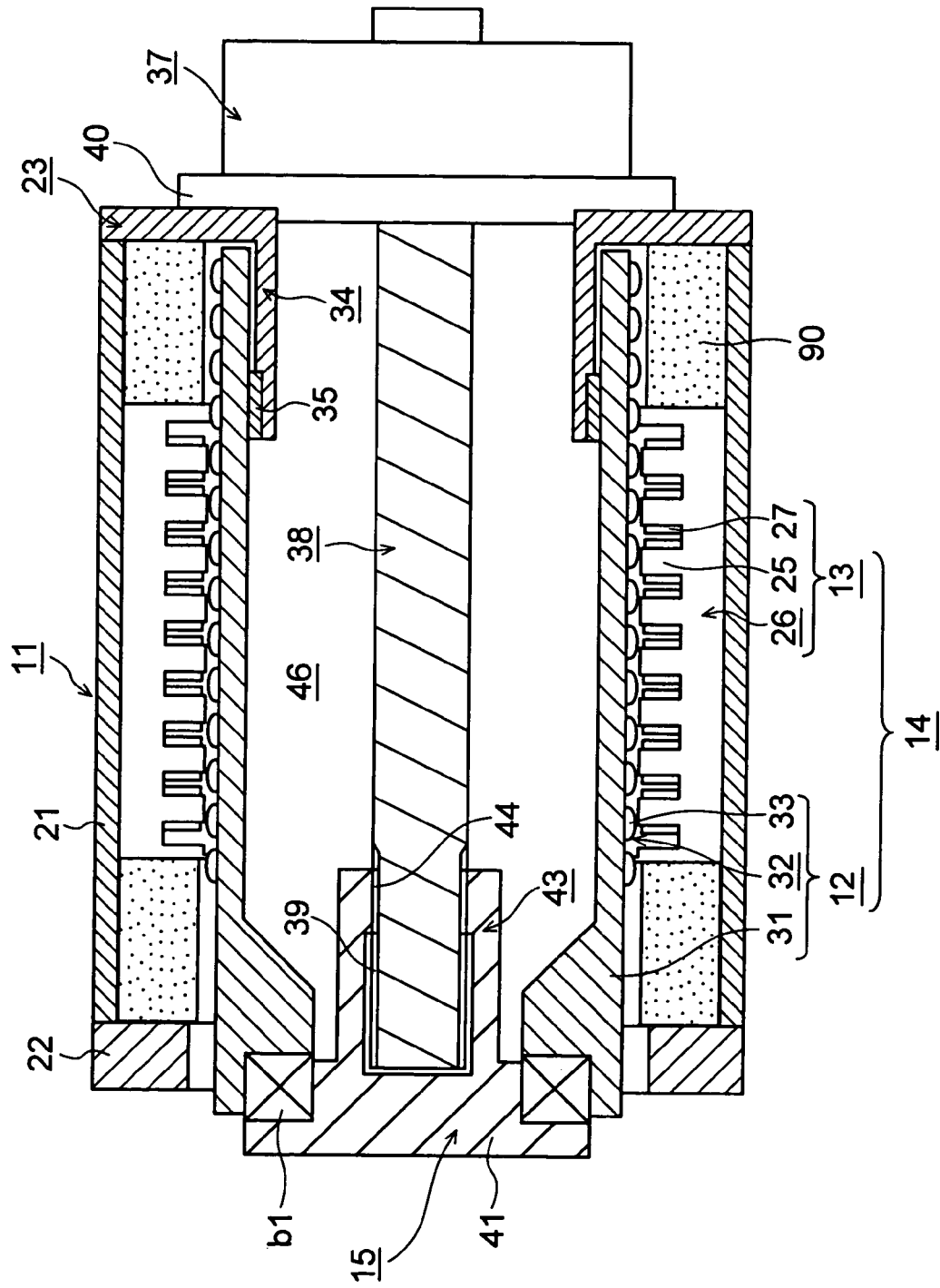
FIG. 9 is a sectional view taken along line X-X of FIG. 8.

FIG. 8 is a cross-sectional view of a drive apparatus according to the eighth embodiment of the present invention, and FIG. 9 is a sectional view taken along line X-X of FIG. 8.

In the drawings, reference numeral 11 denotes a polygonally tubular; in the present embodiment, a hexagonally tubular housing; reference numeral 12 denotes a polygonally tubular movable element; in the present embodiment, a hexagonally tubular movable element disposed within the housing 11 in a manner capable of axially advancing and retreating (moving in the left-right direction in FIG. 9) and formed of a material having high thermal conductivity, e.g., a metal; reference numeral 13 denotes each of stationary elements attached to the inner circumferential surface of the housing 11; and reference numeral 15 denotes a member-to-be-driven, which is disposed in a rotatable relationship to the movable element 12 via a bearing b1 and in a manner capable of advancing and retreating together with the movable element 12. A movable member is fixed to the member-to-be-driven 15. The movable element 12 and the stationary elements 13 constitute a polygonally tubular linear motor; in the present embodiment, a hexagonally tubular linear motor 14, which serves as a first drive section.

The housing 11 includes a hexagonally tubular portion 21; an annular front plate 22 attached to the front end (left end in FIG. 9) of the tubular portion 21, and an annular rear plate 23 attached to the rear end (right end in FIG. 9) of the tubular portion 21. The stationary elements 13 are attached to the tubular portion 21 over a predetermined, substantially central range along the axial direction. Each of the stationary elements 13 includes a core 26 having a plurality of magnetic-pole teeth 25 formed in a radially inward projecting condition and at predetermined pitch spacings, and coils 27 wound on the corresponding magnetic-pole teeth 25. The core 26 and the coils 27 constitute a stator. The magnetic-pole teeth 25 are formed in parallel with one another and along the perimetric direction of the core 26.

The movable element 12 includes a hexagonally tubular core 31, which is disposed radially inward of the stationary elements 13, and permanent magnets 32, which are disposed on the outer perimetric surface of the core 31 and over a predetermined axial range; specifically, a distance of the axial length of the core 26 plus the stroke of the member-to-be-driven 15. The permanent magnets 32 are magnetized such that magnetic poles 33 serving as N pole and magnetic poles 33 serving as S pole are alternately formed at the same pitch spacings as those of the magnetic-pole teeth 25. The magnetic poles 33 are formed in parallel with one another and along the perimetric direction of the core 31. The core 26 and the coils 27 constitute a first drive element, and the permanent magnet 32 constitutes a second drive element. The outer perimetric surface of the core 31 includes six rectangular surfaces sm1 to sm6, and the permanent magnets 32 are attached to the respective surfaces sm1 to sm6.

As the linear motor 14 is driven, current is supplied to the core 31 and causes the core 31 to generate heat. Thus, a thermally conductive resin mold 90 is disposed along the inner perimetric surface of the housing 11 in a manner covering the stationary elements 13. The resin mold 90 is formed of a resin having high thermal conductivity by means of molding. Accordingly, heat generated in the core 31 is transmitted to the housing 11 via the resin mold 90 and released from the housing 11, so that the linear motor 14 can be sufficiently cooled.

In the present embodiment, the movable element 12 and the stationary element 13 are disposed in a hexagonal, tubular shape, and the movable element 12 and the stationary element 13 constitute the hexagonal, tubular linear motor 14. However, the movable element 12 and the stationary element 13 may be disposed in another shape; for example, a cylindrical shape, whereby the movable elements 12 and the stationary elements 13 can constitute a tubular linear motor; for example, a cylindrical linear motor.

When a material having high thermal conductivity and high insulation quality; for example, alumina, is added to the above-mentioned resin, the linear motor 14 can be cooled more efficiently.

Next, application of the drive apparatus to an injection apparatus mounted on a molding machine; for example, an injection molding machine, will be described. In the injection apparatus, the moving direction of a screw at an injection step corresponds to the "front," and the moving direction of the screw at a metering step corresponds to the "rear."

Figure 10:
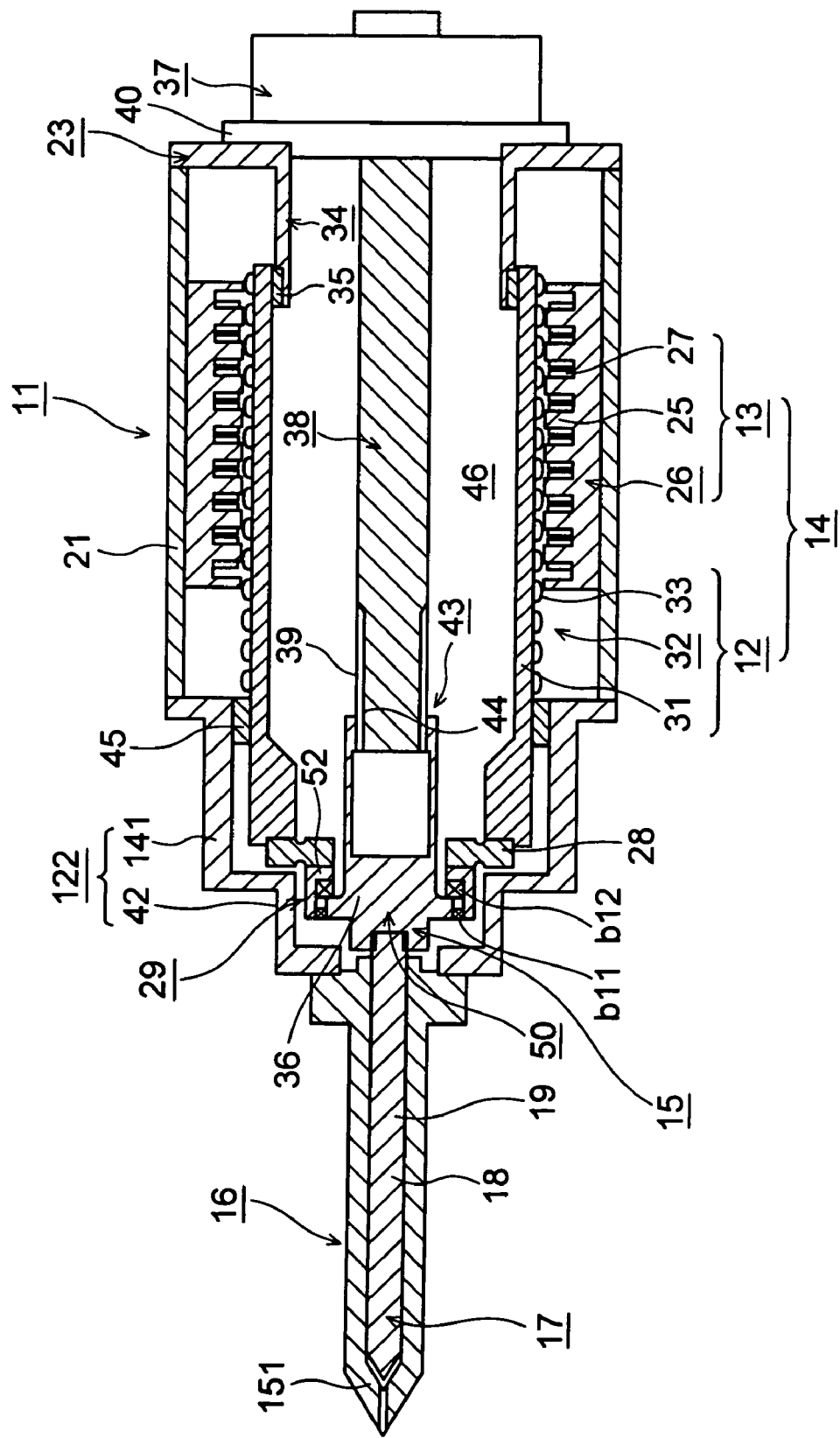
FIG. 10 is a sectional view of an injection apparatus according to a ninth embodiment of the present invention.

FIG. 10 is a sectional view of an injection apparatus according to a ninth embodiment of the present invention.

In the drawing, reference 11 denotes a cylindrical housing, and reference 16 denotes a heating cylinder, which serves as a cylinder member, attached to the front end (left end in the drawing) of the housing 11. An unillustrated hopper is disposed at a predetermined position of the rear end (right end in the drawing) of the heating cylinder 16. Reference numeral 17 denotes a screw, which serves as an injection member, disposed within the heating cylinder 16 rotatably and in a manner capable of advancing and retreating (moving in the left-right direction in the drawing). A spiral flight 18 is formed on the screw 17, and a spiral groove 19 is formed along the flight 18.

Reference numeral 12 denotes a cylindrical, movable element disposed within the housing 11 in a manner capable of axially advancing and retreating; reference numeral 13 denotes a cylindrical stationary element attached to the inner circumferential surface of the housing 11; and reference numeral 15 denotes a member-to-be-driven, which is disposed in a rotatable relationship to the movable element 12 and in a manner capable of advancing and retreating together with the movable element 12 and functions as a torque/thrust-force transmission member for transmitting torque and thrust force. The screw 17 is fixed to the member-to-be-driven 15. The movable element 12 and the stationary element 13 constitute a tubular injection linear motor; in the present embodiment, a cylindrical injection linear motor 14, which serves as a first drive section.

A load cell 28, which serves as a load-detecting section, is disposed between the member-to-be-driven 15 and the movable element 12. In order to support the member-to-be-driven 15 in a rotatable relationship to the movable element 12, a bearing box 29, which serves as a bearing support member, is attached to the front end of the movable member 12 via the load cell 28. Bearings b11 and b12, which serve as first and second bearing members, respectively, are disposed within the bearing box 29 at axially front (left in the drawing) and rear (right in the drawing) positions, respectively. The bearing b11 is disposed between the outer circumferential surface of the member-to-be-driven 15 and the inner circumferential surface of the bearing box 29. The bearing b12 is disposed between the rear end face (right end face in the drawing) of a flange portion 36 of the member-to-be-driven 15 and the front end face (left end face in the drawing) of a flange portion 52 of the bearing box 29, thereby serving as a thrust bearing. The front end face of the core 31 of the movable element 12 is fixed to a radially outward portion of the rear end face of the load cell 28, whereas the rear end face of the bearing box 29 is fixed to a radially inward portion of the front end face of the load cell 28.

The housing 11 includes a cylindrically tubular portion 21; a stepped annular front plate 122 attached to the front end of the tubular portion 21; and an annular rear plate 23 attached to the rear end of the tubular portion 21. The stationary element 13 is attached to the tubular portion 21 over a predetermined, substantially central range along the axial direction. The stationary element 13 includes a core 26 having a plurality of magnetic-pole teeth 25 formed in a radially inward projecting condition and at predetermined pitch spacings, and coils 27 wound on the corresponding magnetic-pole teeth 25. The magnetic-pole teeth 25 are formed in parallel with one another and along the circumferential direction of the core 26. The front plate 122 includes a large-diameter portion 141, which surrounds a front end portion (left end portion in the drawing) of the core 31 and the load cell 28, and a small-diameter portion 42, which surrounds the bearing box 29 and the member-to-be-driven 15.

The movable element 12 includes a cylindrical core 31, which is disposed radially inward of the stationary element 13, and a permanent magnet 32, which is disposed on the outer circumferential surface of the core 31 and over a predetermined axial range; specifically, a distance of the axial length of the core 26 plus the stroke of the screw 17. The permanent magnet 32 is magnetized such that magnetic poles 33 serving as N pole and magnetic poles 33 serving as S pole are alternately formed at the same pitch spacings as those of the magnetic-pole teeth 25. The magnetic poles 33 are formed in parallel with one another and along the circumferential direction of the core 31. The core 26 and the coils 27 constitute a first drive element, and the permanent magnet 32 constitutes a second drive element.

In order to support the movable element 12 in an axially movable relationship to the housing 11, unillustrated guide rails, which serve as axial guide members, are disposed in an axially extending manner on the housing 11 at circumferentially predetermined positions. The movable element 12 is caused to move along the guide rails. An annular slide portion 45, which serves as a first guide member, is formed on the inner circumferential surface of the rear end of the front plate 122 and at a front portion (left portion in the drawing) of the movable element 12. A tubular support portion 34 is formed on the rear plate 23 in a manner projecting frontward from the inner circumferential edge of the rear plate 23 by a length equal to the stroke of the screw 17. An annular slide portion 35, which serves as a second guide member, is formed on the outer circumferential surface of the front end of the support portion 34 and at a rear portion (right portion in the drawing). The front plate 122 supports the movable element 12 such that the outer circumferential surface of the core 31 slides on the slide portion 45, and the support portion 34 supports the movable element 12 such that the inner circumferential surface of the core 31 slides on the slide portion 35. Also, in this manner, the front plate 122 and the support portion 34 position the movable element 12 in relation to the stationary element 13. In this case, preferably, in order to enhance positioning accuracy, the support portion 34 is formed integrally with the rear plate 23. However, the support portion 34 may be formed as a separate member. Notably, a bush or a self-lubricating material, which does not require application of lubricant, can be used to form the slide portions 35 and 45.

In this case, the slide portion 45 supports and guides the movable element 12 from the outside at the output side of the linear motor 14; in the present embodiment, at a front portion of the movable element 12, and the slide portion 35 supports and guides the movable element 12 from the inside at the non-output side of the linear motor 14; in the present embodiment, at a rear portion of the movable element 12. Thus, the length of the core 31 can be shortened accordingly. Therefore, the axial dimension of the linear motor 14 can be reduced.

Meanwhile, the linear motor 14 can be driven through supply of predetermined current; for example, U-phase, V-phase, and W-phase currents, to the coils 27, whereby the movable element 12 can be axially advanced and retreated, and thus the member-to-be-driven 15 can be advanced and retreated. In order to drive the linear motor 14, an unillustrated control section is disposed, and an unillustrated inverter is connected to the coils 27. A drive-processing means of the control section performs a drive process so as to generate a predetermined drive signal, and supplies the drive signal to the inverter. Upon reception of the drive signal, the inverter generates currents of the above-mentioned phases and supplies the currents to the coils 27. In this case, in accordance with the drive signal, the inverter can change patterns of generating the currents of the above-mentioned phases so as to drive the linear motor 14 in the regular direction for causing the movable element 12 to advance (move leftward in the drawing), or to drive the linear motor 14 in the reverse direction for causing the movable element 12 to retreat (move rightward in the drawing). When the movable element 12 is caused to advance, the load cell 28 can detect an associated thrust force. Supply of the detected thrust force to the control section enables feedback control.

As a result, a predetermined thrust force can be generated through drive of the linear motor 14. The thrust force is transmitted to the screw 17 via the member-to-be-driven 15, whereby the thrust force can be used as an injection force for causing the screw 17 to perform injection. A small clearance is formed between the movable element 12 and the stationary element 13. The present embodiment can render the clearance very small, since the core 31 is positioned in the radially outward direction by means of the slide portion 45 and in the radially inward direction by means of the slide portion 35. Therefore, the thrust force can be increased accordingly.

Since the slide portion 35 is disposed radially inward of the movable element 12, the linear motor 14 and the support portion 34 can be disposed in an overlapping condition along the axial direction. Thus, the size of the injection apparatus can be reduced.

In order to rotate the member-to-be-driven 15, an electric metering motor 37, such as a servomotor, which serves as a second drive section, is attached to the rear end face of the rear plate 23 via a flange 40, which serves as a mounting portion, and projects rearward. The motor 37 is of an inner rotor type and includes an unillustrated stator and an unillustrated rotor, which is rotatably disposed radially inward of the stator. The motor 37 can be driven through supply of predetermined current; for example, U-phase, V-phase, and W-phase currents, to the stator, whereby the member-to-be-driven 15 can be rotated, and thus, the screw 17 can be rotated.

To achieve the above operation, a space 46 having a predetermined shape; in the present embodiment, a cylindrical shape, is formed radially inward of the movable element 12. An output shaft 38 of the motor 37 is disposed at the center within the space 46 and extends frontward. Splines 39 are formed on the outer circumferential surface of a front end portion of the output shaft 38 and serve as a driving transmission element having the same length as the stroke of the screw 17. The member-to-be-driven 15 includes a base portion 50 having the flange portion 36 formed on the outer circumferential surface thereof, and a tubular holder portion 43, which projects rearward from the base portion 50 over a distance equal to the stroke of the screw 17. Splines 44 are formed on the inner circumferential surface of the rear end of the holder portion 43 and spline-engaged with the splines 39 so as to serve as a driven transmission element. The splines 39 and 44 constitute a rotation transmission section. The rotation transmission section transmits rotation and torque generated through drive of the motor 37 and output to the output shaft 38, to the member-to-be-driven 15 and then to the screw 17. Also, the rotation transmission section allows axial movement of the member-to-be-driven 15 and the screw 17 in relation to the output shaft 38. In this case, even when transmission of rotation to the movable element 12 via the bearings b11 and b12, the bearing box 29, and the load cell 28 is attempted as the member-to-be-driven 15 is rotated, the guide rails prevent rotation of the movable element 12. In other words, the guide rails function as a rotation stop.

Next, the operation of the thus-configured injection apparatus will be described.

When the injection molding machine is at a metering step, a metering-processing means of the drive-processing means performs a metering process, thereby causing the motor 37 to rotate in the regular direction. This causes the output shaft 38 to rotate in the regular direction. The rotation of the output shaft 38 is transmitted to the member-to-be-driven 15 via the splines 39 and 44, so that the screw 17 is rotated. The rotation of the screw 17 causes a resin, which serves as a molding material, supplied from the hopper moves frontward in the groove 19 while being melted. The resin is stored ahead of the screw 17 by a predetermined amount. The resin stored ahead of the screw 17 presses the screw 17 and causes the screw 17 to move rearward. Subsequently, when the movable element 12 is brought to its retreat limit position, the front end of the core 26 and that of the permanent magnet 32 substantially coincide with each other, and the splines 44 are brought to the rear-end position of the splines 39.

At an injection step, an injection-processing means of the drive-processing means performs an injection process, thereby driving the linear motor 14 so as to generate a predetermined thrust force. The thrust force causes the movable element 12 to advance. Advancement of the movable element 12 causes the member-to-be-driven 15 to advance, thereby causing the screw 17 to advance. The resin stored ahead of the screw 17 is ejected from injection nozzle 151 disposed at the front end of the heating cylinder 16.

Thus, by virtue of using the linear motor 14 as the first drive section, the drive apparatus can exhibit high-speed performance, high responsiveness, and high control accuracy. The movable element 12 and the stationary element 13 constitute the cylindrical linear motor 14. At least a portion of the motor 37; in the present embodiment, not only the output shaft 38 but also the rotation transmission section, is accommodated in the space 46. Thus, the linear motor 14, the output shaft 38, and the rotation transmission section can be disposed in an overlapping condition along the axial direction. Accordingly, the axial dimension of the injection apparatus can be reduced, and thus the size of the injection apparatus can be reduced, with a resultant reduction in the cost of the injection apparatus.

Since the movable element 12 and the stationary element 13 constitute the tubular linear motor 14, the area of the permanent magnet 32 can be sufficiently increased by merely a slight increase in a radial dimension. Accordingly, since the capacity of the linear motor 14 can be increased, the linear motor 14 can generate a large thrust force and can provide short-cycled continuous drive. As a result, injection can be performed with a large injection force, and molding can be performed in short molding cycles.

Since the motor 37 can be disposed on the axis of rotation of the screw 17, the moment of inertia can be reduced. Accordingly, the drive apparatus can be further enhanced in terms of high-speed performance, high responsiveness, and high control accuracy.

Since the stationary element 13 and the motor 37 are attached to the housing 11, when the linear motor 14 is driven, the movable element 12 moves, whereas the motor 37 remains stationary. Accordingly, the weight of a movable portion of the injection apparatus is reduced, so that the moment of inertia can be reduced. As a result, the drive apparatus can be further enhanced in terms of high-speed performance, high responsiveness, and high control accuracy.

Since there is no need to dispose a rotation transmission system, such as a belt or a chain, between the member-to-be-driven 15 and the motor 37; i.e., the member-to-be-driven 15 can be rotated by means of direct drive, noise generated in association with transmission of rotation can be greatly reduced. Since the diameter of the output shaft 38 can be reduced, the moment of inertia can be reduced. Thus, energy that is consumed for driving the motor 37 is reduced, so that the drive efficiency can be enhanced.

Further, even when the motor 37 assumes a long, thin structure, at least a portion of the motor 37 can be accommodated in the movable element 12, so that the axial dimension of the injection apparatus can be reduced.

Since the rotational speed of the motor 37 can be detected on the rotational shaft by use of an unillustrated rotation detector, a method of attaching the rotation detection can be simplified.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape.

Next, a tenth embodiment of the present invention will be described. Like structural elements of the ninth and tenth embodiments are denoted by like reference numerals, and repeated description thereof is omitted. For the effect that the tenth embodiment yields through employment of structural elements similar to those of the ninth embodiment, its description is omitted, and the description of the effect of the ninth-embodiment is incorporated herein by reference.

Figure 11:
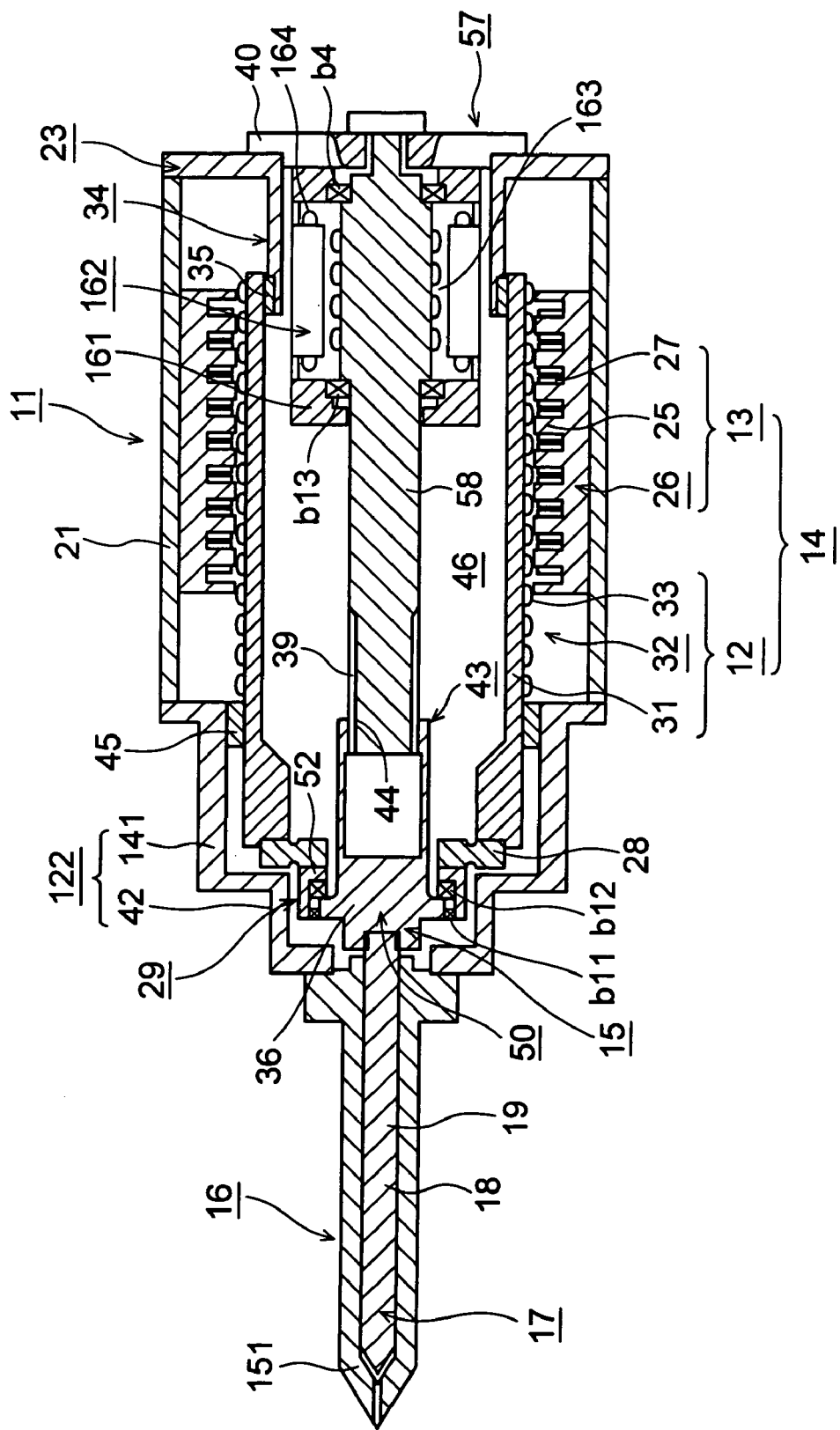
FIG. 11 is a sectional view of an injection apparatus according to a tenth embodiment of the present invention.

FIG. 11 is a sectional view of an injection apparatus according to the tenth embodiment of the present invention.

In this case, in order to rotate the member-to-be-driven 15, an electric metering motor 57, such as a servomotor, which serves as a second drive section, is attached to the rear end face (right end face in the drawing) of the rear plate 23 via the flange 40, which serves as a mounting portion, and projects frontward (leftward in the drawing). The motor 57 is of an inner rotor type and includes a case 161; a stator 162 attached to the case 161; a rotor 163, which is disposed radially inward of the stator 162 and rotatably in relation to the case 161 by means of bearings b13 and b4; and an output shaft 58 formed integrally with the rotor 163. The motor 57 can be driven through supply of predetermined current; for example, U-phase, V-phase, and W-phase currents, to a coil 164 in the stator 162, whereby the member-to-be-driven 15 can be rotated, and thus, the screw 17, which serves as an injection member, can be rotated.

To achieve the above operation, the output shaft 58 is disposed at the center within the space 46 and extends frontward. The splines 39 are formed on the outer circumferential surface of a front end portion (left end portion in the drawing) of the output shaft 58 and serve as a driving transmission element having the same length as the stroke of the member-to-be-driven 15.

In this case, at least a portion of the motor 57; in the present embodiment, not only the stator 162, the rotor 163, the output shaft 58, and the like of the motor 57 but also the rotation transmission section composed of the splines 39 and 44, is accommodated in the space 46. Thus, the cylindrical, injection-effecting linear motor 14, which serves as a first drive section, the stator 162, the rotor 163, the output shaft 58, and the like of the motor 57, and the rotation transmission section can be disposed in an overlapping condition along the axial direction. Accordingly, the axial dimension of the injection apparatus can be reduced, and thus the size of the injection apparatus can be reduced, with a resultant reduction in the cost of the injection apparatus.

In the present embodiment, the movable element 12 and the stationary element 13 are cylindrical, and the movable element 12 and the stationary element 13 constitute the cylindrical linear motor 14. However, the cross sections of the movable element 12 and the stationary element 13 may assume another shape; for example, a polygonal shape, whereby the movable element 12 and the stationary element 13 can constitute a linear motor having a tubular shape; for example, a polygonally tubular shape. The core 26 and the coils 27 constitute a first drive element, and the permanent magnet 32 constitutes a second drive element.

The ninth and tenth embodiments use the motors 37 and 57 of an inner rotor type. However, an electric metering motor of an outer rotor type can be used.

Next will be described an eleventh embodiment of the present invention that uses a metering motor of an outer rotor type. Like structural elements of the ninth and eleventh embodiments are denoted by like reference numerals, and repeated description thereof is omitted. For the effect that the eleventh embodiment yields through employment of structural elements similar to those of the ninth embodiment, its description is omitted, and the description of the effect of the ninth embodiment is incorporated herein by reference.

Figure 12:
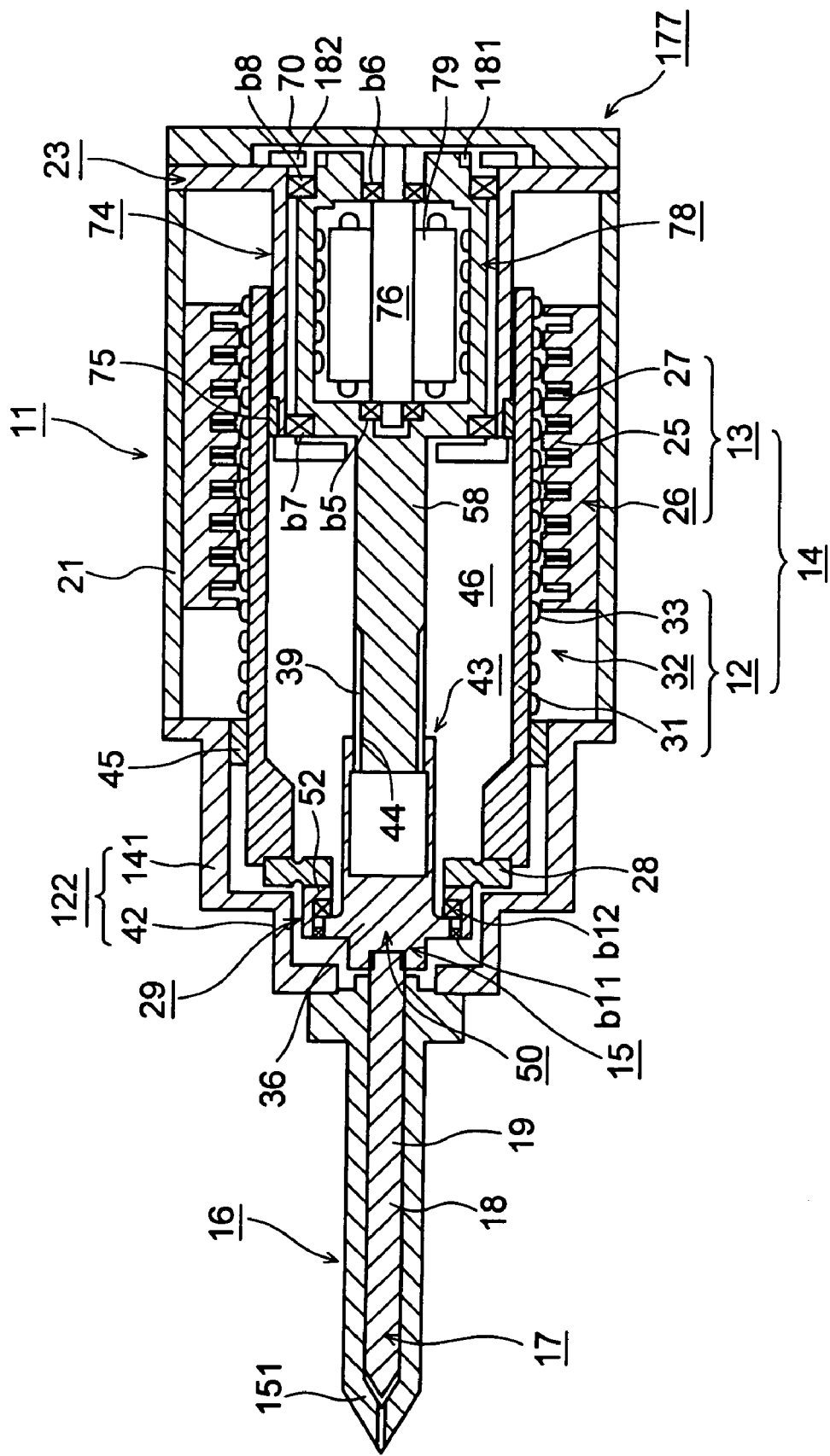
FIG. 12 is a sectional view of an injection apparatus according to an eleventh embodiment of the present invention.

FIG. 12 is a sectional view of an injection apparatus according to the eleventh embodiment of the present invention.

In this case, in order to rotate the member-to-be-driven 15, an electric metering motor 177, such as a servomotor, which serves as a second drive section, is attached to the rear end face (right end face in the drawing) of the rear plate 23 via the flange 70, which serves as a mounting portion, and projects frontward (leftward in the drawing). A tubular support portion 74 is formed on the rear plate 23 in a manner projecting frontward from the inner circumferential edge of the rear plate 23. A slide portion 75 is formed on the outer circumferential surface of the front end of the support portion 74.

The motor 177 is of an outer rotor type and includes a support shaft 76, which is attached to the flange 70 and projects frontward within the space 46; a tubular rotor 78, which surrounds the support shaft 76 and is disposed in a rotatable relationship to the support shaft 76 by means of bearings b5 and b6 and in a rotatable relationship to the support portion 74 by means of bearings b7 and b8; a stator 79 attached, in opposition to the rotor 78, to the outer circumferential surface of the support shaft 76; and an output shaft 58 integrally formed at the front end (left end in the drawing) of the rotor 78. The output shaft 58 and the member-to-be-driven 15 are spline-engaged together by means of the splines 39 and 44. Reference numeral 181 denotes teeth formed on the outer circumferential surface of the rear end (right end in the drawing) of the rotor 78 and serving as an object to be detected. Reference numeral 182 denotes a sensor, which is attached to the rear plate 23 in opposition to the teeth 181 and serves as a rotation detector for detecting the rotational speed of the rotor 78. The core 26 and the coils 27 constitute a first drive element, and the permanent magnet 32 constitutes a second drive element.

In the present embodiment, the rotor 78 is disposed in a rotatable relationship to the support shaft 76 and the support portion 74. However, the rotor 78 may be disposed in a rotatable relationship to either the support shaft 76 or the support portion 74.

Use of the motor 177 of an outer rotor type can increase a motor torque that is generated when the motor 177 is driven.

Next, application of the drive apparatus to a mold clamping apparatus mounted on a molding machine; for example, an injection molding machine, will be described. In the mold clamping apparatus, the moving direction of a movable platen at a mold closing step corresponds to the "front," and the moving direction of the movable platen at a mold opening step corresponds to the "rear."

Figure 13:
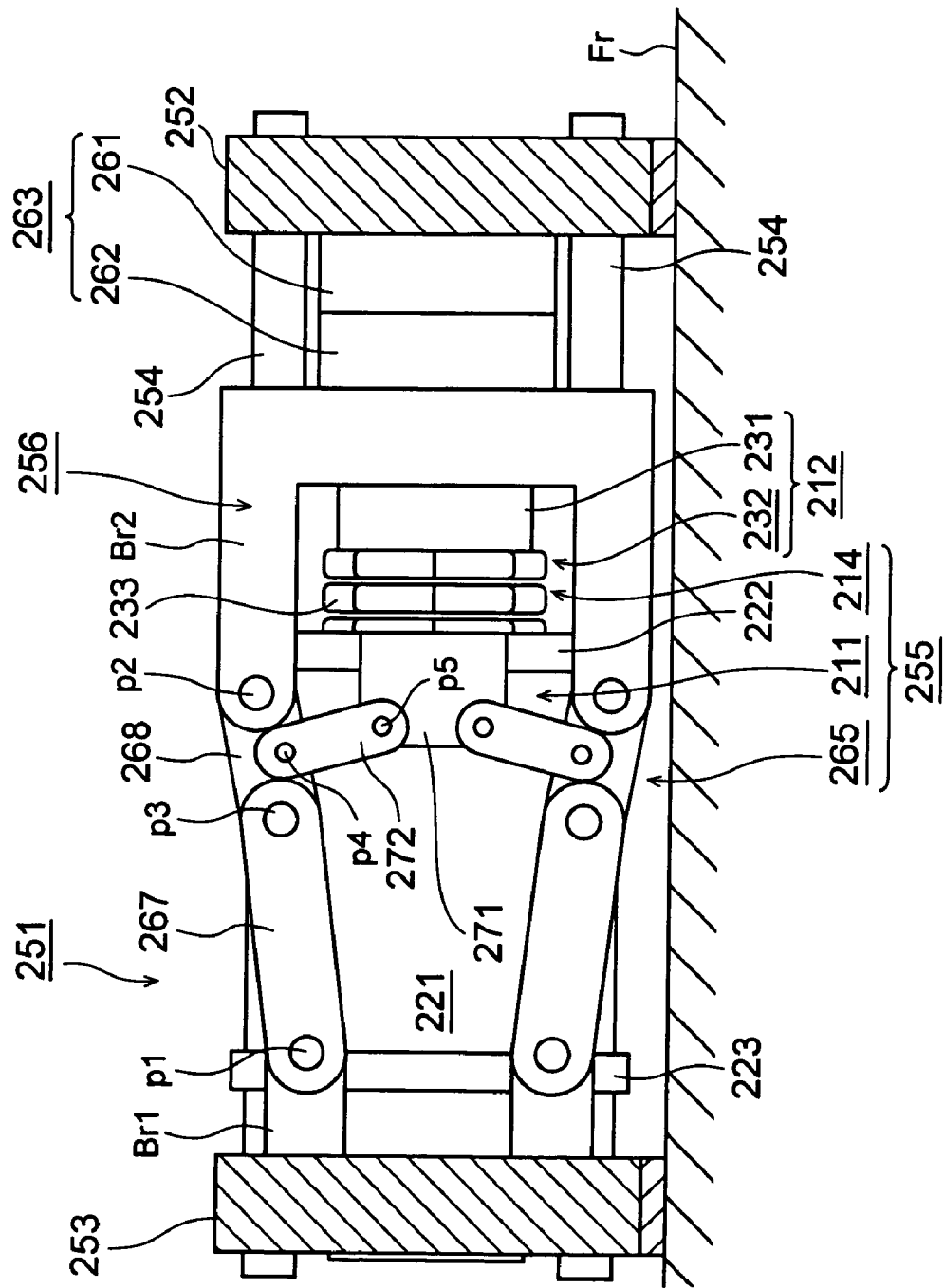
FIG. 13 is a front view of a mold apparatus and a mold clamping apparatus according to a twelfth embodiment of the present invention.
Figure 14:
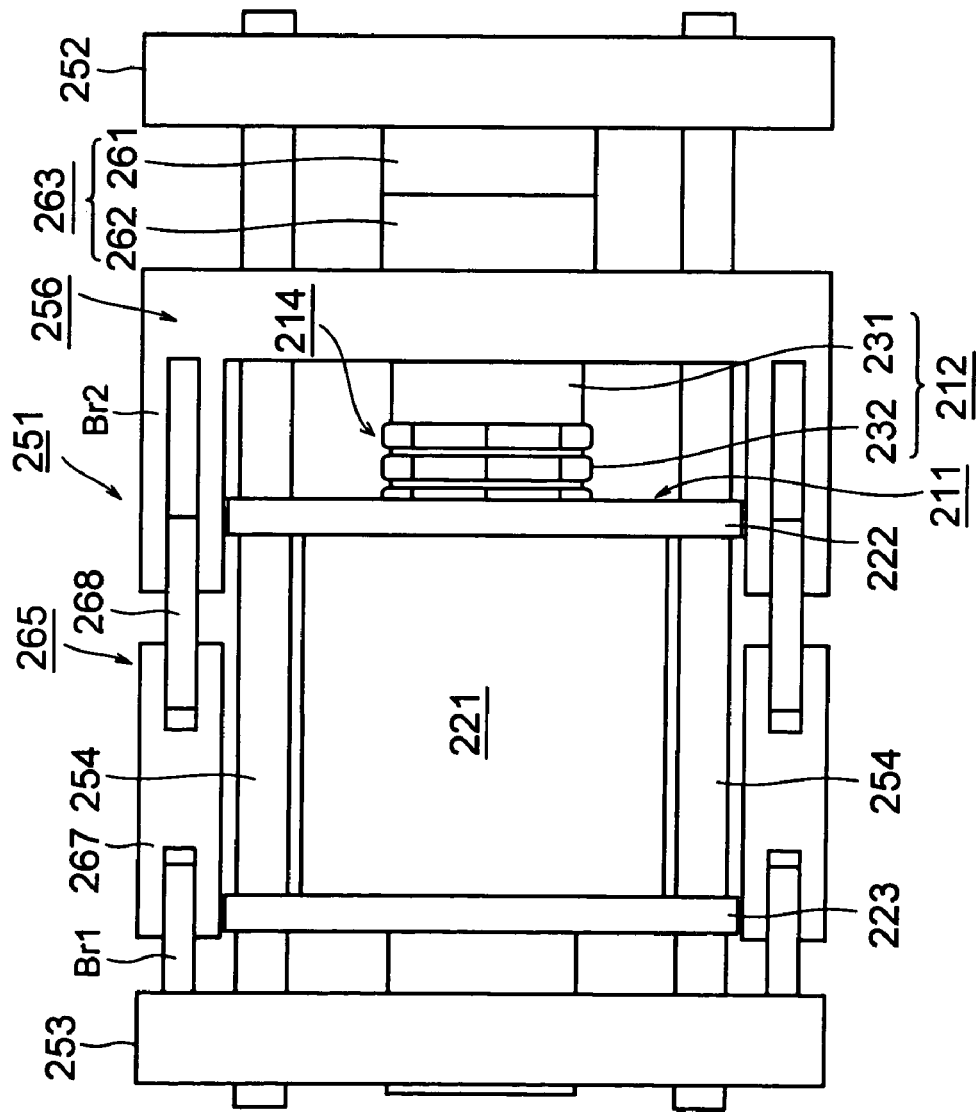
FIG. 14 is a plan view of the mold apparatus and the mold clamping apparatus according to the twelfth embodiment.
Figure 15:
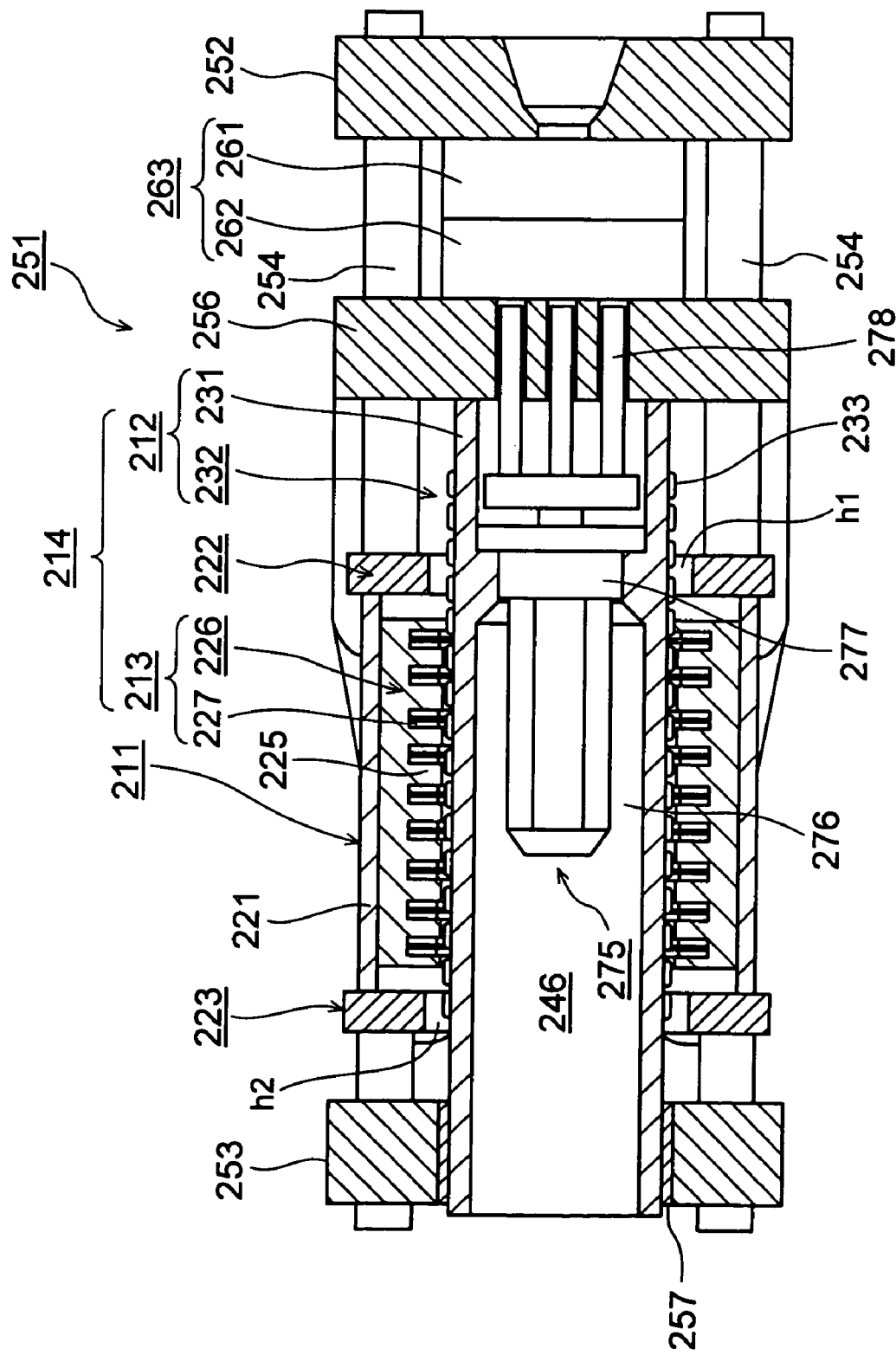
FIG. 15 is a sectional view showing a mold clamped condition of the mold apparatus according to the twelfth embodiment.
Figure 16:
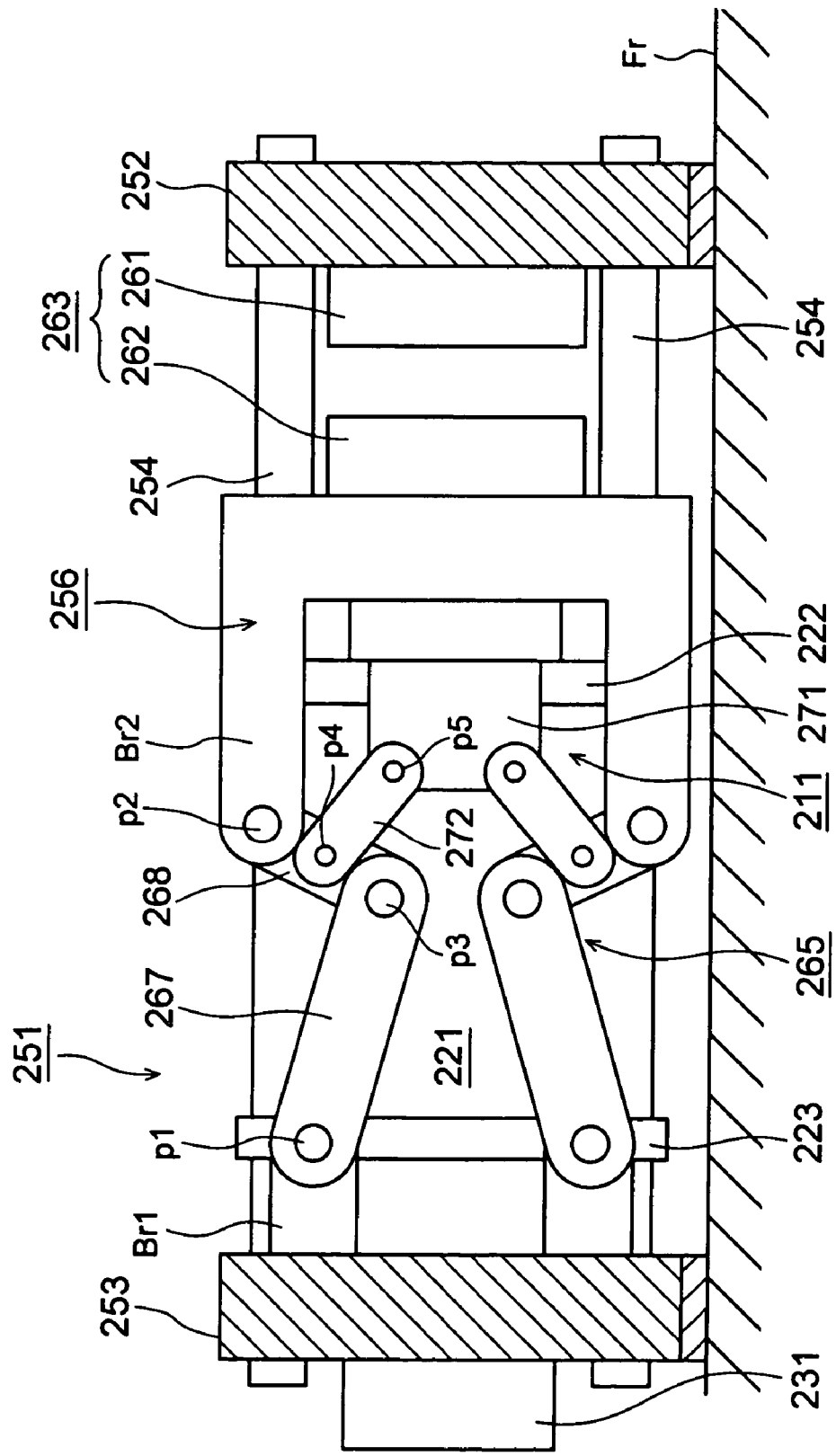
FIG. 16 is a front view showing a mold open condition of the mold apparatus according to the twelfth embodiment.

FIG. 13 is a front view of a mold apparatus and a mold clamping apparatus according to a twelfth embodiment of the present invention; FIG. 14 is a plan view of the mold apparatus and the mold clamping apparatus according to the twelfth embodiment; FIG. 15 is a sectional view showing a mold clamped condition of the mold apparatus according to the twelfth embodiment; and FIG. 16 is a front view showing a mold open condition of the mold apparatus according to the twelfth embodiment.

In the drawings, reference numeral 251 denotes a mold clamping apparatus. The mold clamping apparatus 251 includes a stationary platen 252 attached to a frame Fr of a molding machine, e.g., an injection molding machine, and serving as a first stationary section; a base plate (toggle support) 253 spaced by a predetermined distance apart from the stationary platen 252, attached to the frame Fr, and serving as a second stationary section; four tie bars 254 (only two tie bars 254 appear in the drawings) extending between the stationary platen 252 and the base plate 253 and serving as connection members; a movable platen 256 disposed in a manner capable of advancing and retreating (moving in the left-right direction in the drawings) between the stationary platen 252 and the base plate 253 along the tie bars 254 and serving as a movable section; and a mold clamping mechanism 255 disposed between the movable platen 256 and the base plate 253 and causing the movable platen 256 to advance and retreat.

A stationary mold 261, which serves as a first mold, is attached to the stationary platen 252 on its face in opposition to the movable platen 256. A movable mold 262, which serves as a second mold, is attached to the movable platen 256 on its face in opposition to the stationary platen 252. The stationary mold 261 and the movable mold 262 constitute a mold apparatus 263.

The mold clamping mechanism 255 includes a housing 211 disposed in a manner capable of advancing and retreating along the tie bars 254; a tubular clamping linear motor; in the present embodiment, a cylindrical clamping linear motor 214, which serves as a first drive section; and a toggle mechanism 265 disposed between the movable platen 256 and the base plate 253, adapted to generate a mold clamping force by means of amplification of thrust force generated by the linear motor 214, and serving as an amplifying mechanism section.

The linear motor 214 includes a cylindrical stationary element 212, whose rear end (left end in the drawings) is slidably supported by the base plate 253 via a tubular member 257 and which extends frontward (rightward in the drawings) through the housing 211; and a cylindrical movable element 213, which is attached to the inner circumferential surface of the housing 211 and extends in a manner surrounding the stationary element 212.

The housing 211 includes a cylindrically tubular portion 221; a rectangular front plate 222 attached to the front end (right end in the drawings) of the tubular portion 221; and a rectangular rear plate 223 attached to the rear end of the tubular portion 221. The movable element 213 is attached to the inner circumferential surface of the tubular portion 221. Holes h1 and h2 are formed in the front and rear plates 222 and 223, respectively, so as to allow the stationary element 212 to extend therethrough.

The movable element 213 includes a core 226 having a plurality of magnetic-pole teeth 225 formed in a radially inward projecting condition and at predetermined pitch spacings, and coils 227 wound on the corresponding magnetic-pole teeth 225. The magnetic-pole teeth 225 are formed in parallel with one another and along the circumferential direction of the core 226.

Since one end of the core 226 is attached to the cylindrical stationary element 212, and the other end of the core 226 is supported by the tubular member 257 disposed in the base plate 253, the movable platen 256 can stably advance and retreat, and rectilinearity of the movable platen 256 can be enhanced. In the present embodiment, the core 226 is formed of a single tubular member. However, the core 226 may be formed of a plurality of members.

The stationary element 212 includes a cylindrical core 231, which is disposed radially inward of the movable element 213 and fixed to the movable platen 256, and a permanent magnet 232, which is disposed on the outer circumferential surface of the core 231 and over a predetermined axial range; specifically, a distance of the axial length of the core 226 plus the stroke of a crosshead 271, which serves as an advancing-retreating member. The permanent magnet 232 is magnetized such that magnetic poles 233 serving as N pole and magnetic poles 233 serving as S pole are alternately formed at the same pitch spacings as those of the magnetic-pole teeth 225. The magnetic poles 233 are formed in parallel with one another and along the circumferential direction of the core 231. The core 226 and the coils 227 constitute a first drive element, and the permanent magnet 232 constitutes a second drive element.

The toggle mechanism 265 includes toggle levers 267, which are pivotably connected, via corresponding pins p1, to a bracket Br1 attached to the front end face (right end face in the drawings) of the base support 253; toggle arms 268, which are pivotably connected, via corresponding pins p2, to a bracket Br2 attached to the rear end face (left end face in the drawings) of the movable platen 256, and pivotably connected to the corresponding toggle levers 267 via corresponding pins p3; and toggle levers 272, which are pivotably connected to the corresponding toggle arms 268 via corresponding pins p4 and to the crosshead 271 via corresponding pins p5. The crosshead 271 is attached to a predetermined position of the housing 211; in the present embodiment, the front plate 222, and is disposed in a manner capable of advancing and retreating together with the movable element 213.

Meanwhile, the linear motor 214 is driven through supply of predetermined current; for example, U-phase, V-phase, and W-phase currents, to the coils 227, whereby the movable element 213 can be advanced and retreated, and thus, the crosshead 271 can be advanced and retreated, the toggle mechanism 265 can be activated, and the movable platen 256 can be caused to advance and retreat. In this case, through drive of the linear motor 214, a predetermined thrust force is generated in the movable element 213. As the clearance between the stationary element 212 and the movable element 213 reduces, the thrust force increases.

In order to drive the linear motor 214, an unillustrated control section is disposed, and an unillustrated inverter is connected to the coils 227. In this case, when a predetermined drive signal is generated and supplied to the inverter, the inverter generates currents of the above-mentioned phases and supplies the currents to the coils 227. Accordingly, by means of controlling the drive signal, the linear motor 214 can be driven in the regular direction or in the reverse direction.

By means of driving the linear motor 214 so as to cause the crosshead 271 to advance and retreat, the mold apparatus 263 can undergo mold closing, mold clamping, and mold opening.

The stationary element 212 has a cylindrical shape so as to form a space 246 having a circular cross section within the stationary element 212. An ejector apparatus 275 is disposed within the space 246. The ejector apparatus 275 includes an ejection-effecting electric motor 276, which serves as a second drive section; a ball screw 277 for converting rotary motion generated through drive of the motor 276 to rectilinear motion, the ball screw 277 serving as a motion direction conversion section; a plurality of ejector rods 278 connected to the ball screw 277 and extending frontward through the movable platen 256; and unillustrated ejector pins disposed ahead of the corresponding ejector rods 278 and within the movable mold 262, in a manner capable of advancing and retreating.

In this case, the linear motor 214 and at least a portion of the motor 276; in the present embodiment, the entire motor 276, the ball screw 277, rear portions (left portions in the drawings) of the ejector rods 278, and the like, are disposed in an overlapping condition. Accordingly, the axial dimension of the mold clamping apparatus can be reduced, and thus the size of the mold clamping apparatus can be reduced, with a resultant reduction in the cost of the mold clamping apparatus.

Next, the operation of the thus-configured mold clamping apparatus 251 will be described.

First, at a mold closing step, a mold-closing-processing means of the control section performs a mold closing process and generates an associated, predetermined drive signal so as to drive the linear motor 214 in the regular direction. The activation causes the movable element 213 to retreat (move leftward in the drawings) toward the base plate 253. The retreat causes the crosshead 271 to retreat, thereby operating the toggle mechanism 265 so as to cause the movable platen 256 to advance (move rightward in the drawings). The advancement causes the mold apparatus 263 to undergo mold closing, thereby causing the movable mold 262 to abut the stationary mold 261. As a result, an unillustrated cavity is formed between the stationary mold 261 and the movable mold 262. Through drive of the linear motor 214, thrust force can be generated in the movable element 213. The thrust force is transmitted to the toggle mechanism 265 via the crosshead 271 and amplified by the toggle mechanism 265.

Subsequently, at a mold clamping step, a mold-clamping-processing means of the control section performs a mold clamping process and generates an associated, predetermined drive signal so as to further operate the linear motor 214 in the regular direction. The further operation causes the toggle mechanism 265 to amplify the thrust force generated in the movable element 213, under toggle magnification, thereby generating a predetermined mold clamping force. Accordingly, mold clamping is performed such that the movable mold 262 is further pressed against the stationary mold 261 by the mold clamping force. At this time, resin as a molding material is ejected from an injection nozzle 151 of the injection apparatus (FIG. 12) and charged into the cavity.

At a mold opening step, a mold-opening-processing means of the control section performs a mold opening process so as to drive the linear motor 214 in the reverse direction. As shown in FIG. 16, the activation causes the movable element 213 to advance. The advancement causes the crosshead 271 to advance, thereby causing the movable platen 256 to retreat. Thus, the movable mold 262 can be separated from the stationary mold 261. In this manner, the mold apparatus 263 undergoes mold opening.

Thus, by virtue of using the linear motor 214 as a drive section of the mold clamping apparatus 251, the drive apparatus can exhibit high-speed performance, high responsiveness, and high control accuracy. Since the stationary element 212, the movable element 213, and the like constitute the tubular linear motor 214, the area of the permanent magnet 232 can be sufficiently increased by merely a slight increase in a radial dimension. Accordingly, since the capacity of the linear motor 214 can be increased, the linear motor 214 can generate a large thrust force and enables the mold clamping apparatus 251 to continuously operate in short molding cycles. As a result, the size of the mold clamping apparatus 251 can be reduced accordingly, and the cost of the mold clamping apparatus 251 can be reduced accordingly.

Since the linear motor 214 and at least a portion of the ejector apparatus 275; in the present embodiment, the entire motor 276, the ball screw 277, rear portions of the ejector rods 278, and the like, are disposed in an overlapping condition, the axial dimension of the mold clamping apparatus 251 can be reduced, and thus the size of the mold clamping apparatus 251 can further be reduced.

In the present embodiment, the stationary element 212 and the movable element 213 have a cylindrical shape, and the stationary element 212, the movable element 213, and the like constitute the cylindrical linear motor 214. However, the cross sections of the stationary element 212 and the movable element 213 may assume another shape; for example, a polygonal shape, whereby the stationary element 212 and the movable element 213 can constitute a linear motor having a tubular shape; for example, a polygonally tubular shape.

Next, a thirteenth embodiment of the present invention will be described. Like structural elements of the twelfth and thirteenth embodiments are denoted by like reference numerals, and repeated description thereof is omitted. For the effect that the thirteenth embodiment yields through employment of structural elements similar to those of the twelfth embodiment, its description is omitted, and the description of the effect of the twelfth embodiment is incorporated herein by reference.

Figure 17:
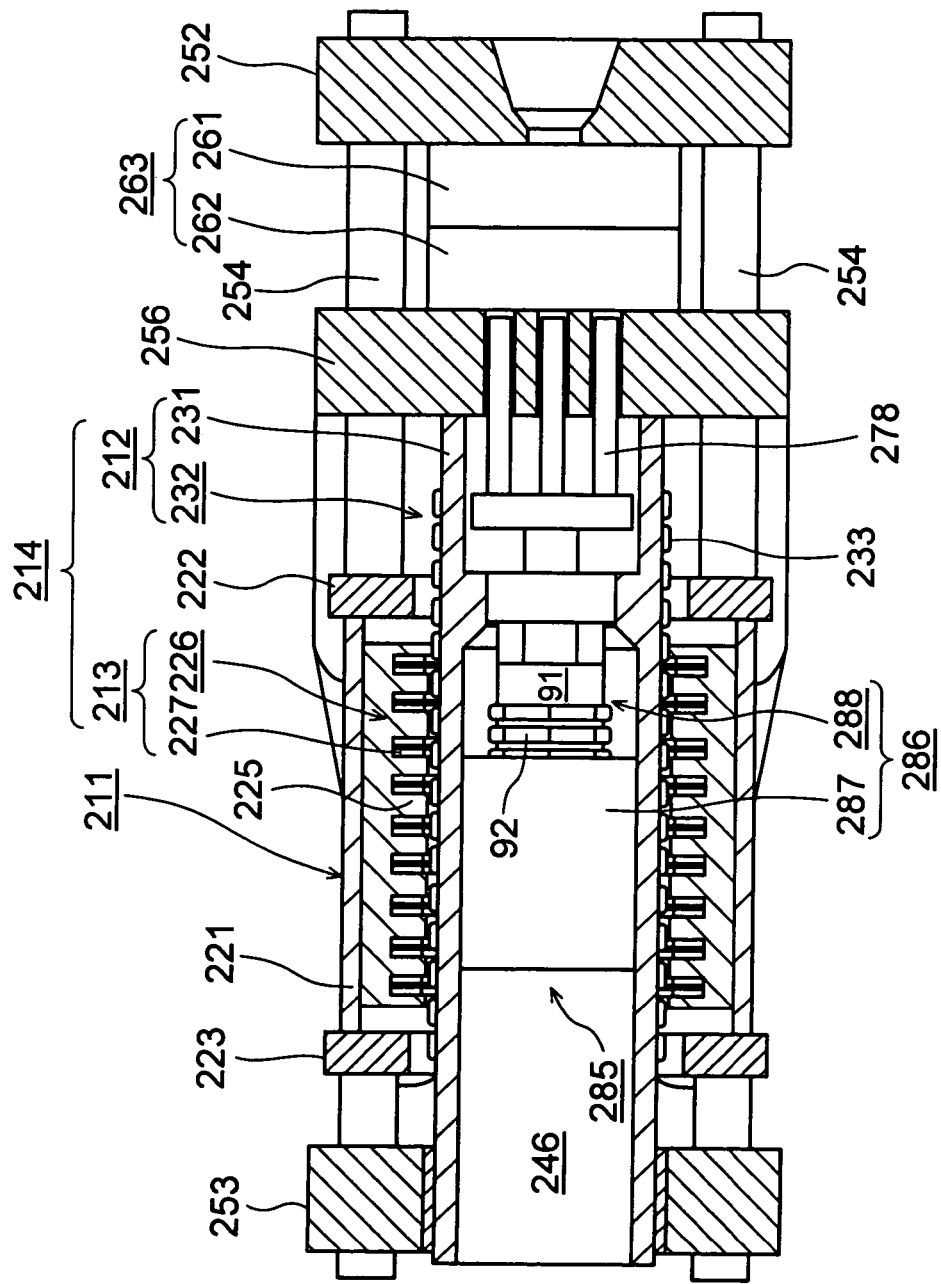
FIG. 17 is a sectional view showing a mold clamped condition of a mold apparatus according to a thirteenth embodiment of the present invention.

FIG. 17 is a sectional view showing a mold apparatus in a mold clamped condition according to a thirteenth embodiment of the present invention.

In this case, an ejector apparatus 285 is disposed within the space 246. The ejector apparatus 285 includes an ejection-effecting linear motor 286, which serves as a second drive section; a plurality of ejector rods 278 which extend frontward (rightward in the drawing) through the movable platen 256 and which are advanced and retreated (moved in the left-right direction in the drawing) through drive of the linear motor 286; and unillustrated ejector pins disposed ahead of the corresponding ejector rods 278 and within the movable mold 262, which serves as a second mold, in a manner capable of advancing and retreating.

The linear motor 286 includes a cylindrical housing 287 attached to the inner circumferential surface of the core 231; a cylindrical, movable element 288 disposed within the housing 287 in a manner capable of advancing and retreating and composed of a core 91 and a permanent magnet 92; and an unillustrated stationary element attached to the inner circumferential surface of the housing 287 and surrounding the movable element 288. The ejector rods 278 are connected to the movable element 288.

In this case, the linear motor 214, which serves as a first drive section, and at least a portion of the linear motor 286; in the present embodiment, the entire linear motor 286, rear portions (left portions in the drawings) of the ejector rods 278, and the like, are disposed in an overlapping condition. Accordingly, the axial dimension of the mold clamping apparatus 251 (FIG. 16) can be reduced, and thus the size of the mold clamping apparatus 251 can be reduced.

In the twelfth and thirteenth embodiments, the stationary element 212 is fixed to the base plate 253, which serves as a second stationary section; the movable element 213 is disposed in a manner capable of advancing and retreating; and the crosshead 271, which serves as an advancing-retreating member, is fixed to the movable element 213. However, the following structure may be acceptable: the housing 211 is fixed to the tie bars 254, which serve as connection members, so that the core 226 and the coils 227 constitute a stationary element; and the core 231 and the permanent magnet 232 constitute a movable element. In this case, the crosshead 271 is attached to the core 231 at a predetermined position.

The core 226 and the coils 227 constitute a first drive element, and the permanent magnet 232 constitutes a second drive element.

Next, a fourteenth embodiment of the present invention will be described. Like structural elements of the twelfth and fourteenth embodiments are denoted by like reference numerals, and repeated description thereof is omitted. For the effect that the fourteenth embodiment yields through employment of structural elements similar to those of the twelfth embodiment, its description is omitted, and the description of the effect of the twelfth embodiment is incorporated herein by reference.

Figure 18:
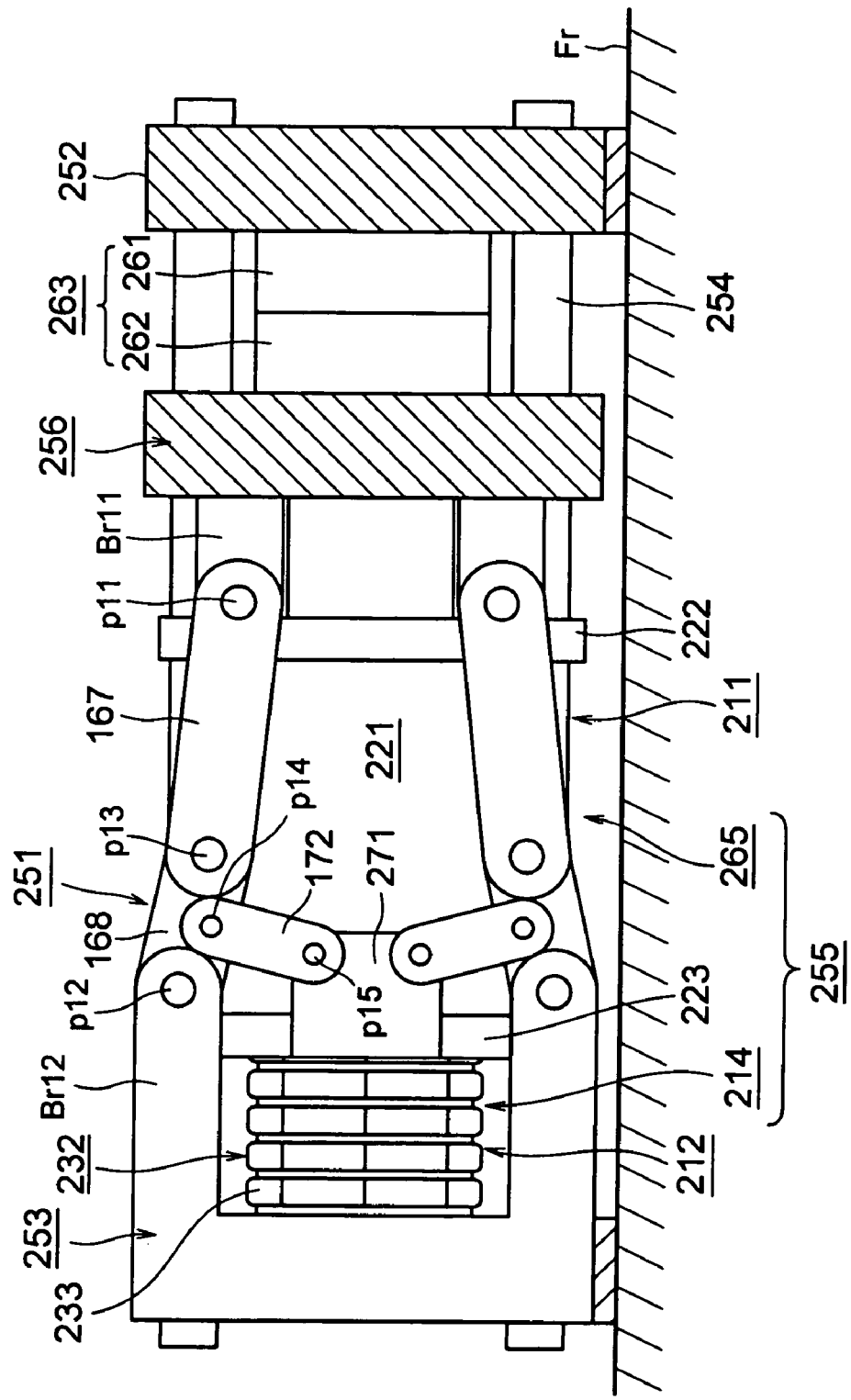
FIG. 18 is a front view of a mold apparatus and a mold clamping apparatus according to a fourteenth embodiment of the present invention.
Figure 19:
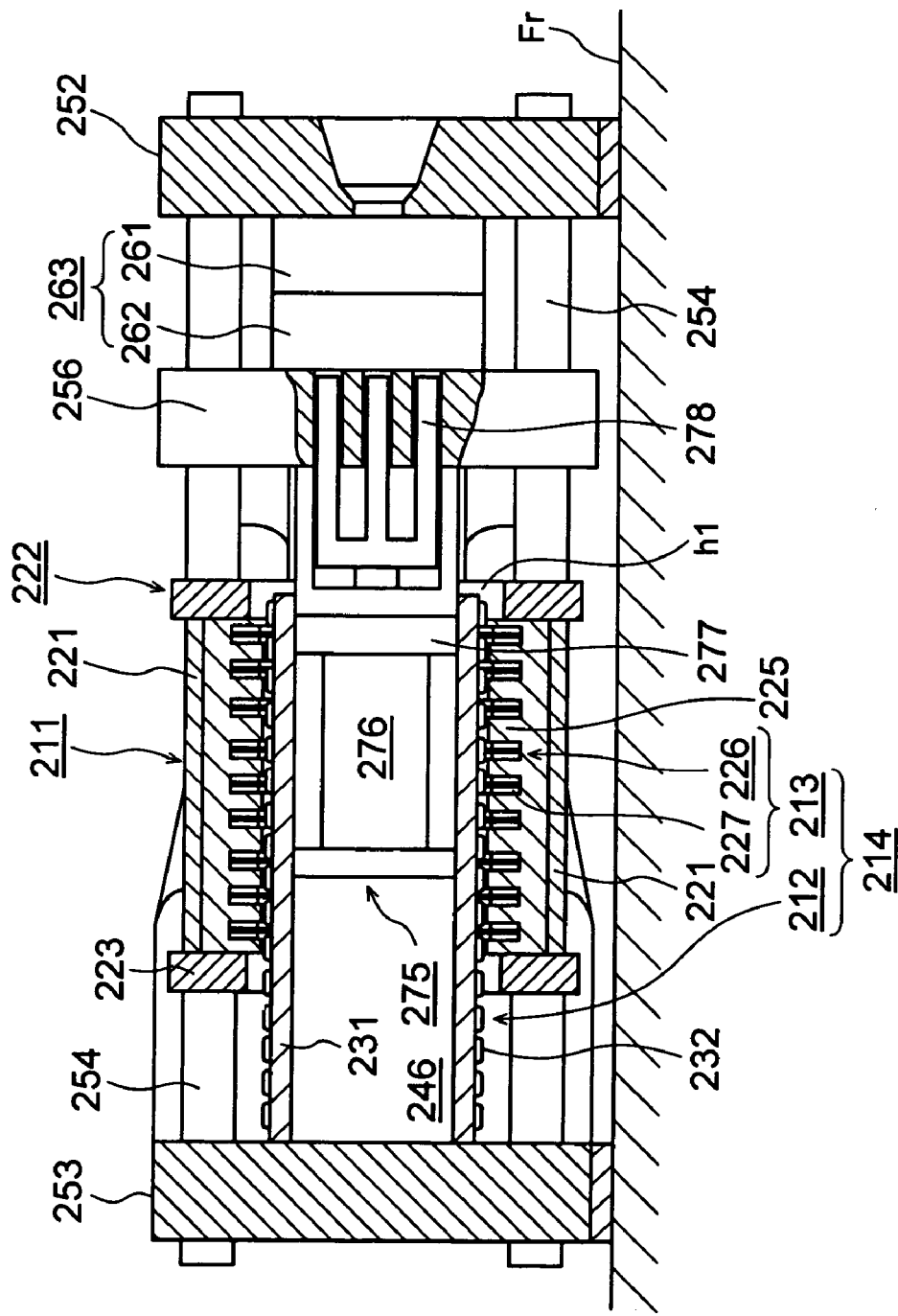
FIG. 19 is a sectional view showing a mold clamped condition of the mold apparatus according to the fourteenth embodiment.

FIG. 18 is a front view of a mold apparatus and a mold clamping apparatus according to the fourteenth embodiment of the present invention, and FIG. 19 is a sectional view showing a mold clamped condition of the mold apparatus according to the fourteenth embodiment.

In this case, the stationary element 212 is fixed to the base plate 253, which serves as a second stationary section. Advancement (rightward movement in the drawings) of the movable element 213 effects mold closing, and retreat (leftward movement in the drawings) of the movable element 213 effects mold opening.

To achieve the above operation, the toggle mechanism 265, which serves as an amplifying mechanism section, includes toggle levers 167, which are pivotably connected, via corresponding pins p11, to a bracket Br11 formed on the rear end face (left end face in the drawings) of the movable platen 256, which serves as a movable section; toggle arms 168, which are pivotably connected, via corresponding pins p12, to a bracket Br12 formed on the front end face (right end face in the drawings) of the base plate 253, and pivotably connected to the corresponding toggle levers 167 via corresponding pins p13; and toggle levers 172, which are pivotably connected to the corresponding toggle arms 168 via corresponding pins p14, and pivotably connected, via corresponding pins p15, to the crosshead 271, which serves as an advancing-retreating member.

The crosshead 271 is attached to a predetermined position of the housing 211; in the present embodiment, the rear plate 223, and is disposed in a manner capable of advancing and retreating together with the movable element 213.

The stationary element 212 has a cylindrical shape so as to form a space 246 having a circular cross section within the stationary element 212. An ejector apparatus 275 is disposed within the space 246. The ejector apparatus 275 includes an ejection-effecting electric motor 276, which serves as a second drive section; a ball screw 277 for converting rotary motion generated through drive of the motor 276 to rectilinear motion, the ball screw 277 serving as a motion direction conversion section; a plurality of ejector rods 278 connected to the ball screw 277 and extending frontward (rightward in the drawings) through the movable platen 256; and unillustrated ejector pins disposed ahead of the corresponding ejector rods 278 and within the movable mold 262, which serves as a second mold, in a manner capable of advancing and retreating.

The core 226 and the coils 227 constitute a first drive element, and the permanent magnet 232 constitutes a second drive element.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention can be applied to a mechanical apparatus having a linear motor.

The invention claimed is:

1. A drive apparatus for an injection molding machine comprising:
a housing;
a tubular linear motor comprising a movable element disposed within the housing in a manner capable of advancing and retreating, and a stationary element attached to the housing, the linear motor serving as a first drive section;
a member-to-be-driven which is advanced and retreated together with the movable element through drive of the linear motor; and
a second drive section which has a rotational shaft and is attached to the housing and disposed such that at least a portion of the second drive section overlaps the linear motor along an axial direction,
wherein the member-to-be-driven can be rotated through drive of the second drive section, and
wherein a rotational shaft of the member-to-be-driven and the rotational shaft of the second drive section are disposed on a same axis.

2. A drive apparatus for an injection molding machine according to claim 1, wherein the first drive section comprises a cylindrical linear motor.

3. A drive apparatus for an injection molding machine according to claim 1, wherein the first drive section comprises a polygonally tubular linear motor.

4. A drive apparatus for an injection molding machine according to claim 1, wherein a rotation transmission section is formed between an output shaft of the second drive section and the member-to-be-driven.

5. A drive apparatus for an injection molding machine according to claim 4, wherein the rotation transmission section is formed in an axially overlapping relationship to the linear motor.

6. A drive apparatus for an injection molding machine according to claim 1, wherein the movable element is fixed to the member-to-be-driven and disposed in a rotatable relationship to the housing and in a manner capable of advancing and retreating in relation to the housing.

7. A drive apparatus for an injection molding machine according to claim 6,
wherein the second drive section comprises a support shaft attached to the housing, and a hollow output shaft surrounding the support shaft,
wherein a stator is attached to the support shaft, and
wherein the output shaft serves as a core of a rotor.

8. A drive apparatus for an injection molding machine according to claim 7, wherein a core of the movable element serves as the hollow output shaft.

9. A drive apparatus for an injection molding machine according to claim 1,
wherein the movable element comprises a core and a permanent magnet,
wherein the stationary element comprises a core and a coil, and
wherein a core of the stationary element is covered with a resin mold.

10. A drive apparatus for an injection molding machine according to claim 9, wherein an additive having higher electrical conductivity than resin is added to the resin mold.

11. An injection apparatus comprising:
a housing;
a cylinder member attached to a front end of the housing;
a tubular linear motor comprising a movable element disposed within the housing in a manner capable of advancing and retreating, and a stationary element attached to the housing, the linear motor serving as a first drive section;
an injection member disposed within the cylinder member rotatably and in a manner capable of advancing and retreating, and connected to the movable element; and
a second drive section attached to the housing and disposed such that at least a portion of the second drive section overlaps the linear motor along an axial direction,
wherein the injection member can be rotated by driving the second drive section, and
wherein a rotational shaft of the injection member and a rotational shaft of the second drive section are disposed on a same axis.

12. An injection apparatus according to claim 11,
wherein a space is formed radially inward of the movable element, and
wherein an output shaft of the second drive section extends within the space.

13. An injection apparatus according to claim 11, wherein the first drive section comprises a cylindrical linear motor.

14. An injection apparatus according to claim 11, wherein the first drive section comprises a polygonally tubular linear motor.

15. An injection apparatus according to claim 11,
wherein the injection member is connected to a member-to-be-driven supported in a rotatable relationship to the movable element, and
wherein a rotation transmission section is formed between an output shaft of the second drive section and the member-to-be-driven.

16. An injection apparatus according to claim 15, wherein the rotation transmission section is formed in an axially overlapping relationship to the linear motor.

17. An injection apparatus according to claim 15, wherein a load-detecting section is disposed between the movable element and the member-to-be-driven.

18. An injection apparatus according to claim 11, wherein the movable element is supported from the outside at an output side of the linear motor, and supported from the inside at a non-output side of the linear motor.

* * * * *